Jan. 22, 1963 H. GAMO 3,074,634

PATTERN RECOGNITION

Filed April 17, 1961 9 Sheets-Sheet 1

INVENTOR
HIDEYA GAMO

BY Sughrue Rothwell Mion and Zinn
ATTORNEYS

Jan. 22, 1963 H. GAMO 3,074,634

PATTERN RECOGNITION

Filed April 17, 1961 9 Sheets-Sheet 2

Jan. 22, 1963 H. GAMO 3,074,634

PATTERN RECOGNITION

Filed April 17, 1961 9 Sheets-Sheet 6

United States Patent Office 3,074,634

Patented Jan. 22, 1963

3,074,634

PATTERN RECOGNITION

Hideya Gamo, Katonah, N.Y., assignor to International Business Machines Corporation, New York, N.Y., a corporation of New York Filed Apr. 17, 1961, Ser. No. 103,432
17 Claims. (Cl. 235—151)

This invention relates to apparatus for recognizing patterns, and more particularly, for generating signals representing said patterns.

The field of pattern and character recognition has assumed primary importance in modern data processing equipment, especially where automatic checking and tabulation of merchandise is desired. Heretofore, most recognizing circuits involved an optical beam or the like for scanning across the face of a character or pattern in the fashion of the well-known television cameras. This method, besides being somewhat slow, depends upon almost perfect registration of the pattern with respect to a fixed coordinate system which is part of the scanning mechanism. Little or no rotation or transverse translation of the pattern, with respect to this coordinate system, can be tolerated by these prior art circuits. Therefore, their utility is almost nil for such applications as identification of merchandise which is borne on moving conveyers or the like, or where such merchandise is somewhat haphazardly placed within the recognizing area.

The present invention obviates many of the above problems by providing a method and means for sensing certain characteristics of particular kinds of patterns, which characteristics are substantially invariant with respect to pattern registration within certain limits. Furthermore, the patterns may assume forms that have coded significance, particularly binary, and they may have either a self-luminous or light reflective characteristic. The invention has particular application in areas such as the recognition of grocery items, or the like.

It is therefore an object of the present invention to provide recognition means for symmetrical patterns in the shapes of circular concentric bands, square concentric bands, parallel bands, and the like.

Another object of the present invention is to provide means to measure the absolute value of the square of the Fourier transform of the light distribution at said pattern.

A further object of the present invention is to provide logical methods and means for generating digital signals representing each pattern scanned.

Still another object of the present invention is the recognition of self-luminous or coherently lighted symmetrical patterns having binary representations, regardless of their registration within limits with respect to the scanning mechanism.

These and other objects of the invention will become apparent during the course of the following description, which is to be taken in conjunction with the drawings, in which:

FIGURE 1 shows a block diagram of one embodiment of the present invention for recognizing self-luminous patterns, together with several types of patterns that may be recognized;

FIGURES 2 and 3 disclose details about the patterns and their corresponding detectors;

Figures 1, 2A, 2B, 3:
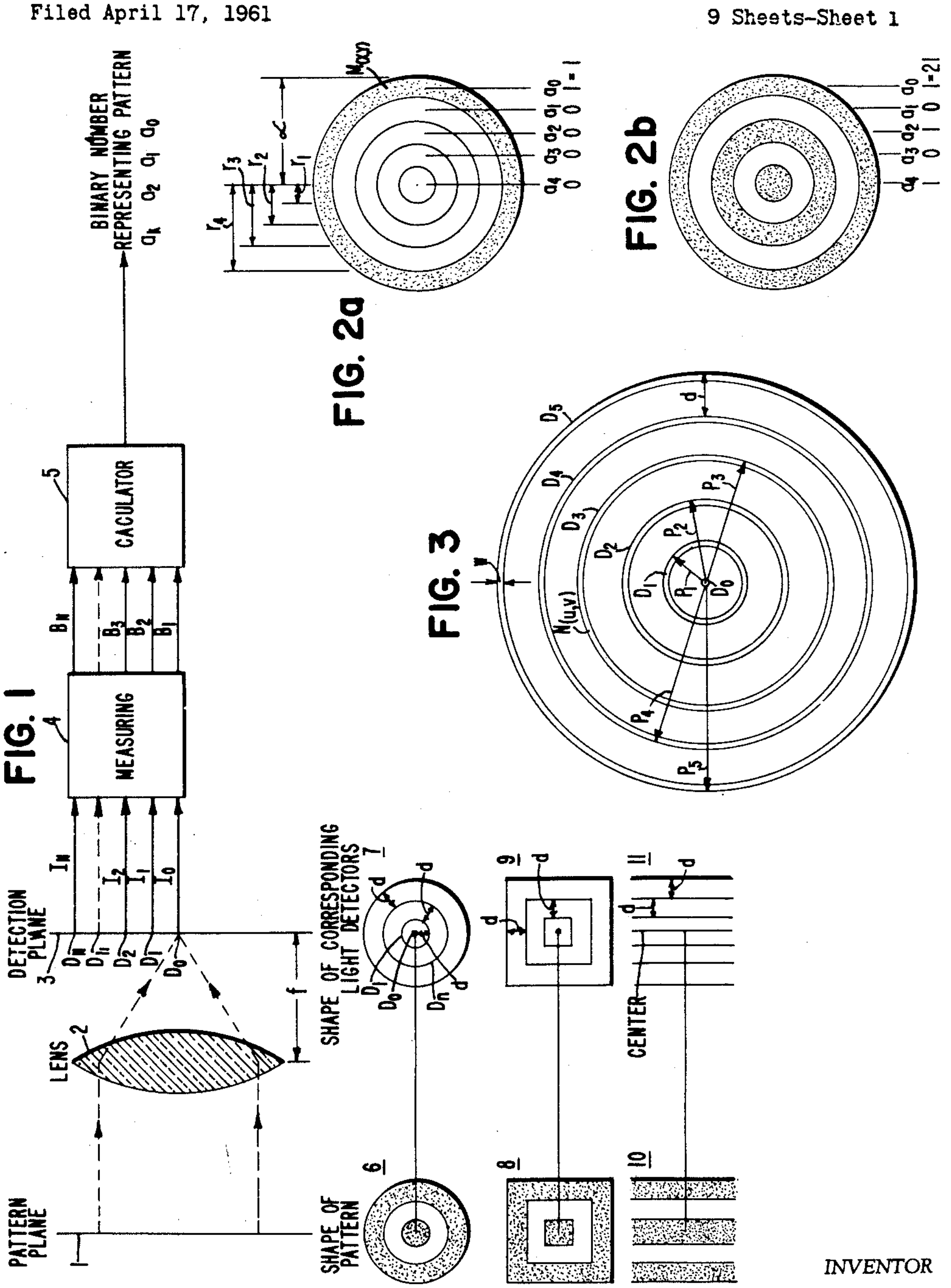

Referring first to FIGURE 1 of the drawings, a block diagram of one embodiment of the invention is shown, together with example of the different shapes of patterns which may be recognized. A self-luminous pattern is placed at pattern plane 1 so that light therefrom may be directed through a focusing lens 2 to impinge upon a detection plane 3. The three pattern shapes shown below pattern plane 1 in FIGURE 1 indicate some of several kinds of patterns which may be recognized by the circuitry of the present invention but are not to be construed as a limitation thereof. For example, a pattern 6 consisting of circular concentric bands may be used, each having binary significance. Each band in this pattern may be composed of such material that light is generated therefrom which impinges upon the detection plane 3. The two dark bands of pattern 6 indicate that they are so constructed. Patterns 8 and 10 are also shown. Pattern 8 comprises a set of rectangular concentric bands, each having a binary order value associated therewith as in pattern 6. In pattern 10, a series of parallel bands are shown, and the pattern is symmetrical about the center band. All three of the patterns 6, 8 and 10 are symmetrical around at least one of its coordinate axes.

Positioned at detection plane 3, which is to the right of lens 2, are detecting elements $D_0, D_1, \ldots D_N$, upon which impinge the light from a pattern at plane 1. Detection plane 3 is the back focal plane of lens 2, this distance being indicated by $f$. Directly beneath detection plane 3 in FIGURE 1 are shown the shape of the light detectors thereat which must be used to detect the different kinds of patterns employed at plane 1. For example, light detector 7 comprises a set of concentric detector rings spaced apart from each other as shown by distances $d$. The light detector 7 has a shape similar to that of pattern 6 with which it is used. In like fashion, detector 9 is in the shape of a series of concentric squares spaced apart from each other. Detectors 9 would be used when the patterns 8 appear on pattern plane 1. When the patterns take the shape of 10, the detectors 11 are as shown and consist of a series of parallel lines spaced apart from each other. Other symmetrical patterns of different shapes can also be sensed, by correspondingly shaped detectors. The structure of the light detectors will subsequently be explained in detail, however, each may generally consist of a thin photoconductive element responsive to light which generates a current proportional to its intensity. In a further embodiment of the invention, the detectors merely consist of openings in the detection plane 3 through which light from the object may be selectively passed so as to strike a single photocell therebehind. Only one shape of pattern may normally be employed at the pattern plane for any particular shape light detector at detection plane 3 for the most reliable operation.

Each of the detctor elements measures the intensity of the light incident thereon and produces a signal proportional thereto. These signals may be represented by the terms $I_0, I_1, \ldots I_N$ where there are $N+1$ detector elements present, including the detector at the center of the detection plane which is required when the pattern is self-luminous. The signals are transmitted to unit 4 which combines them in a manner hereinafter to be described in order to produce certain translational invariant signals $B_1, B_2 \ldots B_N$ whose subscripts relate them to each of the detectors $D_1, D_2 \ldots D_N$. Since the patterns appearing at pattern plane 1 are self-luminous, each signal $B_n$ appearing from unit 4 represents the absolute value of a particular mutual coherence factor $\Gamma$ which will be subsequently defined. These output signals $B_n$ are next applied to circuit 5 which contains logic for mathematically combining the $B_n$ signals with values permanently stored therein to produce a number of binary bits, $a_0, a_1, a_3 \ldots a_K$ representing the binary significance of the pattern at pattern plane 1. As noted previously, each concentric band, square, or bar of a pattern has a different binary order significance, with its variable $a_k$ being 1 in the preferred embodiment if light is transmitted therefrom to the detection plane.

Referring now to FIGURES 2 and 3, the general theory of operation of the device in FIGURE 1 will be explained. For purposes of this discussion, a pattern having the shape of circular concentric bands is assumed to be placed at the pattern plane 1. Two of these patterns are illustrated in FIGURES 2*a* and 2*b*. A five ring pattern, including the center circle, is shown, although patterns containing any number $n$ of the rings may be used. Each of the rings has a binary order significance such that the outer most ring represents order $2^0$, while the innermost ring (circle) represents order $2^4$. The binary order significance of the other rings progresses toward the center from $2^1$, to $2^3$, as the rings become smaller. In the embodiment of FIGURE 1, a ring is formed of a self-luminous material, such as phosphor, only if the binary variable $a_k$ of that order is to have a value of 1. Otherwise, a ring is formed of non-luminous material if the variable is to have a value of 0. The self-luminous characteristics of phosphor are evident under irradiation by ultraviolet light. Other self-luminous material may also be employed for the patterns, and, as will subsequently be described in connection with FIGURE 10 pattern rings may also be formed of reflecting material which is illuminated by coherent light.

In FIGURES 2*a* and 2*b*, any rings formed of the self-luminous material are shaded. Thus, in FIGURE 2*a*, only the outermost ring possesses this self-luminescent quality. Since this ring has binary order $2^0$ significance, the binary variable $a_0$ associated with this order has a value of 1. All other variables $a_1$ through $a_4$ have a value of 0, because the rings having under significance $2^1$ through $2^4$, respectively, are made of non-luminous material. The pattern of FIGURE 2*a* may therefore be represented by a binary number $$0\times2^4+0\times2^3+0\times2^2+0\times2^1+1\times2^0=00001$$

which has a decimal significance of 1. In FIGURE 2*b*, three rings are formed of self-luminous material so that binary variables $a_4, a_3$, and $a_0$ have the value 1. Therefore, the pattern of FIGURE 2*b* may be represented by the binary number $$1\times2^4+0\times2^3+1\times2^2+0\times2^1+1\times2^0=10101$$

having a decimal significance of 21. In the case where the pattern of FIGURE 2*a* is being sampled by the circuits of FIGURE 1, the output binary number appearing from calculating unit 5 will take the form of 00001, while a sample of the FIGURE 2*b* pattern will make this output have the form of 10101. Thus, the invention, as generally shown in FIGURE 1, will produce a binary number having a value unique to the pattern being scanned. Furthermore, this number is produced as a result of observing the whole pattern at the same time, rather than by sequentially sensing incremental areas therein as is done in much of the prior art.

Since the patterns shown in FIGURES 2*a* and 2*b* have a number of rings equal to 5, then the maximum number of ring combinations is $2^5$, or 32. This includes the situation where none of the rings of a pattern have self-luminosity, such that the pattern is represented by 00000, or decimal 0. For patterns having N number of bands corresponding to the number of detector rings $D_0$, the total combination available is $2^N$.

The radii of the rings in the patterns of FIGURES 2*a* and 2*b* are represented by $r_1, r_2, r_3, r_4$, and $\alpha$, where $\alpha$ is the maximum radius. These dimensions are shown in FIGURE 2*a*. For purposes of the present analysis two specific kinds of patterns will be considered. One kind is that where each ring has the same width, i.e., $$r_1=r_2-r_1=r_3-r_2=r_4-r_3=\alpha-r_4$$

However, this geometry is not essential to the operability of the invention, and a second kind of pattern is that where rings of equal area are employed. In this second case, the following relationships must hold:

$$\pi r_1^2=\pi r_2^2-\pi r_1^2=\pi r_3^2-\pi r_2^2=\pi r_4^2-\pi_3^2=\pi\alpha^2-\pi r_4^2$$

In other words, $r_2=\sqrt{2}r_1$; $r_3=\sqrt{3}r_1$; $r_4=2r_1$; and $\alpha=\sqrt{5}r_1$. However, the procedures specifically developed for the above two kinds of patterns can be extended for patterns where the rings have dimensional relationships other than the above. The only criterion, as regards the present invention, is that the pattern be symmetrical with respect to at least one of its X or Y center axes. This means that indicia representing a binary order has a mirror image on the opposite side of the X or Y axes, or both.

Turning now to FIGURE 3, a description will be given of the detectors used for sensing light emitted from the patterns of FIGURES 2*a* and 2*b*. As shown in FIGURE 1, these detectors are placed at the back focal plane of lens 2, and should be of a shape similar to the pattern which is to be recognized. Since the present discussion is limited to concentric rings, the detectors in FIGURE 3 are also of this shape. However, it is to be understood that this particular shape of pattern and detector is not to be construed as a limitation of the invention. For the five ring patterns as shown in FIGURES 2*a* and 2*b*, there are provided five detector rings $D_1$ through $D_5$, together with a center detector $D_0$. These detector rings may take several forms, depending upon the method used for generating the output signals $B_1$ through $B_N$ shown in FIGURE 1. For example, each detector $D_n$ may comprise a thin annular ring of photoemissive material which produces a current $I_n$ proportional to the intensity of light falling thereon. The center detector $D_0$ is also made of such material. Alternatively, each detector ring may comprise an annular slit in an opaque plane surface, together with a set of "light" gates positioned adjacent to said slit so as to allow the transmission of light therethrough only when said set of light gates is selected by control logic. In this second scheme, the transmitted light is incident on a single detector placed behind the back focal plane, so that current is produced proportional to the light intensity. These two forms of detector rings will be more fully described in connection with FIGURES 4, 5, and 6. However, it should briefly be mentioned here that the center detector $D_0$ is not required when the patterns are made of reflective material instead of self-luminous phosphor. This distinction will become apparent later on, and for the present, only self-luminous patterns are under consideration.

In FIGURE 3, the width W of each detector ring $D_n$ may be extremely small when compared with the distance $d$ between adjacent rings. The radius of each ring, as measured from the center detector $D_0$, is represented by $\rho_1, \rho_2, \rho_3, \rho_4$, and $\rho_5$. Formulas for calculating these radii will subsequently be given in the discussion to follow.

Several equations will now be derived which will explain the operation of the present invention. A detailed description of the structure shown in FIGURES 4 and 9 then follows, wherein a combination of circuits is shown for accomplishing the functions defined by said equations.

In FIGURE 2*a*, first assume that the location of each point source of self-luminous light on the pattern can be expressed in terms of a rectangular coordinate system having X and Y axes with an origin at the pattern center.

Now select a specific point M on said pattern having coordinate values of $x$ and $y$. Also assume that the location of each point at the detection plane can be expressed in terms of a rectangular coordinate system having U and V axes with the origin at the center where detector $D_0$ is placed, as in FIGURE 3. Select a first detection point N having coordinate values of $u$ and $v$ on said detection plane, and a second detection point $D_0$ having coordinates 0, 0. It has been found that a Fourier transformation of the light intensity distribution I at point M in the pattern yields the so-called "mutual coherence factor" $\Gamma$ as measured between points $D_0$ and N at the detection plane. Thus, $$\Gamma_{(u,v)}=\int_{-\infty}^{+\infty}\int_{-\infty}^{+\infty}I_{(x,y)}e^{-ik(ux+vy)}dxdy \quad (1)$$

The mutual coherence factor $\Gamma_{(u,\ v)}$ may also be defined in the following manner.

$$\Gamma_{(u,v)}=\langle V_{(0,0)}{}^{(t)}V^{*}_{(u,v)}{}^{(t)}\rangle \quad (2)$$

where $V_{(0,0)}{}^{(t)}$ represents the light wave disturbances due to the pattern point source M which are measured at the center of the detection plane, $$V^{*}_{(u,v)}{}^{(t)}$$

represents the complex conjugate of the light wave disturbances which are measured at point N of the detection plane, and $\langle\rangle$ represents the time averaging (or integration) of the product. For a detailed analysis of the significance of Equations 1 and 2, reference may be made to Chapter 10 of "Principles of Optics," Born and Wolf, Pergamon Press (1959).

The mutual coherence factor $\Gamma_{(u,\ v)}$ is generally a complex number in the form of $a+ib$, which has an absolute value $|\Gamma_{u,\ v}|$ in the form of $\sqrt{a^2+b^2}$. Assume now that the pattern of FIGURE 2$a$ is now shifted with respect to the X and Y coordinate system, so that point M has coordinates of $x+\Delta x$, $y+\Delta y$. A different mutual coherence factor $\Gamma_{(u',\ v)}$ will now be measured at points N and $D_0$ of the detection plane. The relationship between $\Gamma_{(u',\ v)}$ and $\Gamma_{(u,\ v)}$ is given by the following equation.

$$\Gamma_{(u,'v)}=\Gamma_{(u,v)}e^{ik(\Delta x+\Delta y)} \quad (3)$$

The absolute value of $\Gamma_{(u,'v)}$ is therefore equal to the absolute value of $\Gamma_{(u,\ v)}$, i.e., $|\Gamma_{(u,\ v)}|$. Therefore, it may be appreciated that regardless of pattern registration with respect to the detection plane (within certain limits, the absolute value of the mutual coherence factor $\Gamma$ is the same when it is measured between the same two points at the detection plane. Another way of stating the above is to say that the absolute value of the mutual coherence factor at the back-focal plane of lens 2 is independent of any shift of the self-luminous circular pattern along the object plane 1, or even in a direction parallel to the optical axis. This fact is employed in the present invention for the purpose of accurate pattern recognition regardless of pattern translation with respect to the detector plane. This feature is especially useful where accurate positioning of the pattern is not possible or impractical, as might be the case where merchandise is marked with a pattern or patterns to represent its price, etc.

The mutual coherence factor $\Gamma_{(u,\ v)}$ may also be represented in its polar coordinate form by $$\Gamma_{(\rho,\theta)}$$

where $\rho$ is the distance of point N from the center of the detection plane, and $\theta$ is the angle made with a reference line. The quantity $I_{(x,y)}$ may likewise be represented by $I_{(r,\phi)}$, where $r$ is the distance from the center of the pattern, and $\phi$ is the angle. When the intensity distribution I of a complete ring of points at radius $r$ is considered, then $I_{(r,\phi)}$ reduces to $I_{(r)}$, since $\phi$ is continuous from 0 to $2\pi$. At the detection plane, an analogous transformation may be made from $$\Gamma_{(\rho,\theta)} \text{ to } \Gamma_{(\rho)}$$

This latter term represents the mutual coherence function measured between the center of the detection plane, and a detector ring having a radius $\rho$. Equations 1 and 3 above may be extended to prove that $$\Gamma_{(\rho)}$$

is equal to the Fourier transform of I(r), and that its absolute value $$|\Gamma_{(\rho)}|$$

is independent of pattern registration. Furthermore, when considering a complete pattern having a number of concentric self-luminous bands, each with a finite width, a mutual coherence function $$\Gamma_{(\rho)}$$

may be measured at the detection plane whose absolute value is dependent only upon the binary combination of said self-luminous bands, but not upon the pattern registration. For any given pattern, however, $$|\Gamma_{(\rho)}|$$

will also vary according to the value of $\rho$ at which a detector ring is located.

In the embodiment shown in FIGURE 3, detector rings $D_1$, $D_2$,$D_3$,$D_4$, and $D_5$ exist at discrete radii $\rho_1$, $\rho_2$, $\rho_3$, $\rho_4$, and $\rho_5$ with respect to the center detector $D_0$. Therefore, the values $$|\Gamma_{(\rho1)}|,|\Gamma_{(\rho2)}|,|\Gamma_{(\rho3)}|,|\Gamma_{(\rho4)}|, \text{ and } |\Gamma_{(\rho5)}|$$

are respectively measurable between these detector rings and the center detector $D_0$. In FIGURE 1, the signals $B_1$, $B_2$, $B_3$, . . . $B_N$ (where $N=5$ for the present discussion) represent the values of $|\Gamma(\rho_1)$ etc., when the pattern is self-luminous. These signals $B_1$, $B_2$, $B_3$, . . .$B_N$ are generated in unit 4 by combining signals $I_O$,$I_1$, $I_2$ . . . $I_N$ in a manner subsequently to be described.

For any given pattern, the above five mutual coherence factors, which are obtained from the detector rings in FIGURE 3, have the following matrix relationship to the five binary bit values $a_0$, $a_1$, $a_2$, $a_3$, and $a_4$ which numerically represent the pattern being sampled.

$$\pm|\Gamma(\rho_1)|=\pm A_{14}a_4\pm A_{13}a_3\pm A_{12}a_2\pm A_{11}a_1\pm A_{10}a_0$$

$$\pm|\Gamma(\rho_2)|=\pm A_{24}a_4\pm A_{23}a_3\pm A_{22}a_2\pm A_{21}a_1\pm A_{20}a_0$$

$$\pm|\Gamma(\rho_3)|=\pm A_{34}a_4\pm A_{33}a_3\pm A_{32}a_2\pm A_{31}a_1\pm A_{30}a_0$$

$$\pm|\Gamma(\rho_4)|=\pm A_{44}a_4\pm A_{43}a_3\pm A_{42}a_2\pm A_{41}a_1\pm A_{40}a_0$$

$$\pm|\Gamma(\rho_5)|=A_{54}a_4\pm A_{53}a_3\pm A_{52}a_2\pm A_{51}a_1\pm A_{50}a_0 \quad (4)$$

In Equations 4 above, each of the $a_0$, $a_1$, . . . $a_4$ variables has a binary value equal to +1 or 0, depending upon the pattern being sampled. Each $A_{nk}$ value, where $n$ is the particular detector sampling ring and $k$ is the binary order indication of the associated variable $a_k$, is equal to the value of the mutual coherence factor $$\pm|\Gamma(\rho_n)|$$

of a pattern having only the $a_k$ ring self-luminous. Thus, the value of $$\pm|\Gamma(\rho_n)|$$

for any pattern is $$\pm|\Gamma(\rho_n)|=\sum_{k=1}^{+k}\pm|\Gamma_{a_k}(\rho_n)|a_k \quad (5)$$

To illustrate the above, assume that the value $$\pm|\Gamma(\rho_2)|$$

of matrix 4 is to be represented in terms of the $A_{nk}$ and $a_k$ values, when a pattern is being sampled having a binary representation of 00101. This particular mutual coherence factor may then be represented as $$\pm|\Gamma_{a_0a_2}(\rho_2)|$$

According to line 2 of Equation 4, $$\pm|\Gamma_{(\rho_2)}|=\pm A_{24}a_4+A_{23}a_3\pm A_{22}a_2\pm A_{21}a_1\pm A_{20}a_0 \qquad (6)$$

The respective values of $a_4$, $a_3$, $a_2$, $a_1$, and $a_0$ are 00101. Therefore, the terms $\pm A_{24}a_4$, $\pm A_{23}a_3$, and $\pm A_{21}a_1$ of Equation 6 are all equal to zero. In the remaining terms $\pm A_{22}$ is equal to the value of $$\pm|\Gamma_{(\rho_2)}|$$

for a pattern having only one self-luminescent ring, $a_2$. This particular value may be represented by $$\pm|\Gamma_{a_2(\rho_2)}|$$

In like fashion, the matrix element $\pm A_{20}$ is equal to the value of $$\pm|\Gamma_{(\rho_2)}|$$

for a pattern having only one self-luminescent ring, that represented $a_0$. This may be represented as $$\pm|\Gamma_{a_0(\rho_2)}|$$

Therefore, Equation 6 becomes $$\pm|\Gamma_{a_0a_2(\rho_2)}|=\pm|\Gamma_{a_2(\rho_2)}|\pm|\Gamma_{a_0(\rho_2)}| \qquad (7)$$

In the invention as shown in FIGURE 1, the problem presented is: given the measured values of $$\pm|\Gamma_{(\rho_n)}|$$

and the $\pm A_{nk}$ matrix elements, calculate the binary variables $a_0$, $a_1$, $a_2$, $a_3$, $a_4$. This may be done easily by first determining the inverse matrix values $A_{nk}^{-1}$, and then preceding according to the following equations:

$$\begin{aligned}
a_4&=\pm A_{14}^{-1}|\Gamma_{(\rho_1)}|\pm A_{13}^{-1}|\Gamma_{(\rho_2)}|\pm A_{12}^{-1}|\Gamma_{(\rho_3)}|\pm A_{11}^{-1}|\Gamma_{(\rho_4)}|\\
&\quad\pm A_{10}^{-1}|\Gamma_{(\rho_5)}|\\
a_3&=\pm A_{24}^{-1}|\Gamma_{(\rho_1)}|\pm A_{23}^{-1}|\Gamma_{(\rho_2)}|\pm A_{22}^{-1}|\Gamma_{(\rho_3)}|\pm A_{21}^{-1}\\
&\quad\Gamma_{(\rho_4)}|\pm A_{20}^{-1}|\Gamma_{(\rho_5)}|\\
a_2&=\pm A_{34}^{-1}|\Gamma_{(\rho_1)}|\pm A_{33}^{-1}|\Gamma_{(\rho_2)}|\pm A_{32}^{-1}|\Gamma_{(\rho_3)}|\pm\\
&\quad A_{31}^{-1}|\Gamma_{(\rho_4)}|\pm A_{30}^{-1}|\Gamma_{(\rho_5)}| \qquad (8)\\
c_1&=\pm A_{44}^{-1}|\Gamma_{(\rho_1)}|\pm A_{43}^{-1}|\Gamma_{(\rho_2)}|\pm A_{42}^{-1}|\Gamma_{(\rho_3)}|\pm\\
&\quad A_{11}^{-1}|\Gamma_{(\rho_4)}|\pm A_{40}^{-1}|\Gamma_{(\rho_5)}|\\
a_0&=\pm A_{54}^{-1}|\Gamma_{(\rho_1)}|\pm A_{53}^{-1}|\Gamma_{(\rho_2)}|\pm A_{52}^{-1}|\Gamma_{(\rho_3)}|\pm A_{51}^{-1}|-\\
&\quad\Gamma_{(\rho_4)}|\pm A_{50}^{-1}|\Gamma_{(\rho_5)}|
\end{aligned}$$

The inverse matrix values $A_{nk}^{1}$ may be calculated from the original matrix values $A_{nk}$ by well-known mathematical techniques. These values are stored within unit 5 for use with the measured values of $$\pm|\Gamma_{(\rho_n)}|$$

which are represented in the figures by signals $B_n$. The variables $a_0$ through $a_4$ are calculated therein in the manner prescribed by matrix 8.

As has been indicated throughout the above discussion, the measured values $$|\Gamma_{(\rho_n)}|$$

may have either positive or negative significance, depending upon the binary significance of the pattern. If the improper sign is given to one or more of these values when they are used in matrix 8, then one or more of the binary variables $a_0$–$a_4$ will have a value other than +1 or 0. In the present invention, it is impossible to initially determine the proper signs for the measured values $$|\Gamma_{(\rho_n)}|$$

Therefore, a particular sign is assumed for each, and the calculated variables $a_0$ through $a_4$ are examined to see if all are valid. If any are invalid, i.e., equal to binary values other than 1 or 0, then a different combination of signs is employed, until a valid output is obtained. This output then represents, in binary fashion, the particular pattern under observation. Due to the lack of precision when measuring the values $$|\Gamma_{(\rho_n)}|$$

however, it may be necessary to provide a range of values within which a binary variable $a_n$ will be considered valid.

Before turning to the description of the hardware used to perform the above described functions, the equations for the detector radii $\rho_n$ and for the stored values of $\pm A_{nk}^{-1}$ will be formulated. The intensity distribution $I(r)$ of a self-luminous concentric band pattern may be given in the form of a Fourier-Bessel expansion:

$$I_{(r)}=\sum_{n=1}^{+\infty}A_nJ_0\left(\lambda_{on}\frac{r}{\alpha}\right) \qquad (9)$$

where $A_n$ is the Fourier Bessel coefficient, $\alpha$ is the maximum pattern radius, $$J_0\left(\lambda_{on}\frac{r}{\alpha}\right)$$

is a Bessel function of order zero, and $\lambda_{on}$ is the $n$th positive root of $J_0(x)=0$. These roots $\lambda_{on}$ may be obtained from any well-known table such as page 748 of Watson, "Theory of Bessel Functions." Since $$\Gamma_{(\rho)}$$

is the Fourier transform of $I(r)$, then $$I_{(r)}=\sum_{n=1}^{+\infty}A_n\alpha^2\lambda_{on}J_0^1(\lambda_{on})\frac{J_0(K\alpha\rho)}{(K\alpha\rho)^2-\lambda_{on}^2} \qquad (10)$$

where $J_0'(\lambda_{on})$ is the derivative of $J_0(x)$ at $x=\lambda_0$, and $K=2\pi\lambda$ where $\lambda$ is the wave length of the self-luminous light from the pattern.

Equation 10 may be transformed into the following:

$$\Gamma_{(\rho)}=\sum_{n=1}^{+\infty}A_n\alpha^2\frac{\{J_0^1(\lambda_{on})\}^2}{2}C_{on}(K\alpha\rho) \qquad (11)$$

where $C_{on}$ is a function of $K\alpha\rho$ and is equal to $$2\lambda_{on}J_0(K\alpha\rho)/J_0^1(\lambda_{on})[(K\alpha\rho)^2-\lambda_{on}^2]$$

Where $K\alpha\rho=\lambda_{01}$, for example, the function $C_{on}(\lambda_{01})$ equal to 1, while all other functions $C_{on}(\lambda_{01})$ equal zero. Therefore, Equation 11 becomes $$\Gamma_{(\rho_1)}=A_1\alpha^2\frac{\{J_0^1(\lambda_{01})\}^2}{2} \qquad (12)$$

where $$\rho_1=\frac{\lambda_{01}}{K\alpha}$$

and $\lambda_{01}$ is the first positive root of the function $J_0(X)=0$.

In like manner, $$\Gamma_{(\rho_2)}=A_2\alpha^2\frac{\{J_0^1(\lambda_{02})\}^2}{2} \qquad (13)$$

where $$\rho_2=\frac{\lambda_{02}}{K\alpha}$$

Therefore, the detector rings $D_n$ are placed at radii $$\rho_n=\frac{\lambda_{0n}}{K\alpha} \qquad (14)$$

It may be seen from Equation 14 that when the pattern is very large or if the wave length of the self-luminescent light is small, then $\rho_n$ will be small. Theoretically $\rho_n$ is generally independent of the focal length $f$ of lens 2 in FIGURE 1. However, in practice the spatial frequency of the pattern may have to be considered, so that Equation 14 above is modified as below.

$$\rho_n=\frac{\lambda_{0n}}{K\alpha}2\pi f \qquad (15)$$

where $f$ is the focal length of object lens 2. The subsequent discussion, however, utilizes Equation 14 for $\rho_n$ instead of Equation 15 for purposes of simplicity.

Particular formulas for calculating the values of $A_{nk}$ will now be developed for patterns having five binary coded rings. The techniques to be described, however, is applicable for patterns having any number N of rings, whether of equal width, equal area, or having same other relationship.

Equation 1 may be written in the general form $$\Gamma_{(\rho_n,\theta)}=\int_0^{2\pi}\int_0^{+\infty}I(r,\phi)e^{-ik\rho_n r(\cos\theta-\phi)}rdrd\phi \qquad (16)$$

Assume first that the pattern has concentric rings all of equal width, and that only the outermost band is self-luminous so that $a_0=1$, while $a_1$ through $a_4$ all equal zero. The width of this band is $\alpha=\frac{4}{5}\alpha$, where $\alpha$ is the maximum radius of the pattern. Equation 16 now becomes $$\Gamma_{a_0(\rho_n,\theta)}=\int_{4/5\alpha}^{\alpha}I_{(r)}rdr\int_0^{2\pi}e^{-ik\rho_n r\cos(\theta-\phi)}d\phi \qquad (17)$$

Where $I(r)$ is considered equal to 1 between the limits of Equation 17, this equation can be written as $$\Gamma_{a_0(\rho_n)}=\int_{4/5\alpha}^{\alpha}r2\pi J_0(K\rho_n r)dr \qquad (18)$$

which reduces to $$\Gamma_{a_0(\rho_n)}=\pi\alpha^2\left[\frac{2J_1(K\alpha\rho_n)}{K\alpha\rho_n}-(0.8)^2\frac{2J_1(0.8K\alpha\rho_n)}{(0.8)K\alpha\rho_n}\right] \qquad (19)$$

where $J_1(x)$ is a Bessel function of the first order. By using the values of $\rho_n$ as determined by Equations 14 or 15, the values of $$\Gamma_{a_0(\rho_1)},\Gamma_{a_0(\rho_2)},\Gamma_{a_0(\rho_3)},\Gamma_{a_0(\rho_4)}$$

and $$\Gamma_{a_0(\rho_5)}$$

may be calculated, which are the values of matrix elements $A_{10}$, $A_{20}$, $A_{30}$, $A_{40}$, and $A_{50}$ in Equation 4.

Equations similar to 19 may be developed for the remaining $A_{nk}$ matrix elements. For example, in a pattern where $a_1=1$, and $a_0$, $a_2$, $a_3$, $a_4$ all equal zero, the width of the band $a_1$ is $\frac{4}{5}\alpha-\frac{3}{5}\alpha$, and $$\Gamma_{a_1(\rho_n)}=\int_{3/5\alpha}^{4/5\alpha}r2\pi J_0(K\rho_n r)dr$$

$$=\pi\alpha^2\left[\frac{(0.8)^2 2J_1(0.8K\alpha\rho_n)}{(0.8)K\alpha\rho_n}-(0.6)^2\frac{2J_1(0.6K\alpha\rho_n)}{(0.6)K\alpha\rho_n}\right] \qquad (20)$$

From Equation 20, the values of $A_{11}$, $A_{21}$, $A_{31}$, $A_{41}$, and $A_{51}$ may be derived by using the values of $\rho_1$, $\rho_2$, $\rho_3$, $\rho_4$ and $\rho_5$ from the sampling theorem.

For matrix elements $A_{12}$, $A_{22}$, $A_{32}$, $A_{42}$ and $A_{52}$, insert values of $\rho_n$ into the following:

$$\Gamma_{a_0(\rho_n)}=\pi\alpha^2\left[\frac{(0.6)^2 2J_1(0.6K\alpha\rho_n)}{(0.6)K\alpha\rho_n}-(0.4)^2\frac{2J_1(0.4K\alpha\rho_n)}{(0.4)K\alpha\rho_n}\right] \qquad (21)$$

For matrix elements $A_{13}$, $A_{23}$, $A_{33}$, $A_{43}$ and $A_{53}$, $$\Gamma_{a_3(\rho_n)}=\pi\alpha^2\left[(0.4)^2\frac{2J_1(0.4K\alpha\rho_n)}{0.4K\alpha\rho_n}-(0.2)^2\frac{2J_1(0.2K\alpha\rho_n)}{0.2K\alpha\rho_n}\right] \qquad (22)$$

For matrix elements $A_{14}$, $A_{24}$, $A_{34}$, $A_{44}$, and $A_{54}$, $$\Gamma_{a_4(\rho_n)}=\pi\alpha^2\left[(0.2)^2\frac{2J_1(0.2K\alpha\rho_n)}{0.2K\alpha\rho_n}\right] \qquad (23)$$

To illustrate the practical use of Equations 19 through 23, Tables 1, 2, and 3 shown below give actual values for $\pm A_{nk}$, $\pm A_{nk}^{1}$, and $\pm B_n$, respectively, when the following conditions are observed. A first condition is that the product $K\alpha$ in the Equations is everywhere set equal to 1 in order to avoid having to select specific values for K and $\alpha$. A second condition, which is implied from the first, is that the value $\pi\alpha^2$ in the Equations is disregarded. A third condition is that Equations 19 through 23 do not include, and the tabulated values therefore do not reflect, the effects of different kinds of detectors about which more will be said at a later time. The fourth and last condition is that the specific values of $\rho_n$ used in the calculations are obtained from Equation 14. Therefore, in view of the foregoing four conditions, the values shown in Table 1 are somewhat universal in that they can be used for a great variety of five ring equal width patterns and their corresponding detectors when modified by constants of proportionality. As modified by the above conditions, Equation 19, for example, is written thus:

$$\frac{\Gamma_{a_0(\rho_n)}}{\pi\alpha^2}=\frac{2J_1(\rho_n)}{\rho_n}-(0.8)^2\frac{2J_1(0.8\rho_n)}{(0.8)\rho_n} \qquad (24)$$

In Table 1 below, the calculated values for matrix elements $A_{n0}$ are therefore given by the values of $$\frac{\Gamma_{a_0(\rho_n)}}{\pi\alpha^2}$$

in Equation 24 above. Equations 20 through 23 are modified in like manner. Since in Equation 14 the product $K\alpha=1$, then the values of $\rho_n$ are equal to the roots $\lambda_{on}$.

*Table 1 (Equal Width)*

| | | | | |
|---|---|---|---|---|
| ($A_{14}$) 0.03879716 | ($A_{13}$) 0.10253332 | ($A_{12}$) 0.12882002 | ($A_{11}$) 0.10529524 | ($A_{10}$) 0.03479924 |
| ($A_{24}$) 0.03420750 | ($A_{23}$) 0.04619826 | ($A_{22}$) −0.03351407 | ($A_{21}$) −0.10703550 | ($A_{20}$) −0.06313878 |
| ($A_{34}$) 0.02677955 | ($A_{33}$) −0.01258735 | ($A_{32}$) −0.06173734 | ($A_{31}$) 0.04237965 | ($A_{30}$) 0.06790198 |
| ($A_{44}$) 0.01793893 | ($A_{43}$) −0.03710698 | ($A_{42}$) 0.02097157 | ($A_{41}$) 0.02194642 | ($A_{40}$) −0.06317820 |
| ($A_{54}$) 0.00922103 | ($A_{53}$) −0.02433223 | ($A_{52}$) 0.03520270 | ($A_{51}$) −0.04439320 | ($A_{50}$) 0.05196863 |

*Table 2 (Equal Width)*

| | | | | |
|---|---|---|---|---|
| ($A_{14}^{-1}$) 3.76458916 | ($A_{13}^{-1}$) 7.91384161 | ($A_{12}^{-1}$) 11.44796181 | ($A_{11}^{-1}$) 11.97894013 | ($A_{10}^{-1}$) 6.69892615 |
| ($A_{24}^{-1}$) 3.34710628 | ($A_{23}^{-1}$) 3.58027130 | ($A_{22}^{-1}$) −1.49422532 | ($A_{21}^{-1}$) −8.56844771 | ($A_{20}^{-1}$) −6.35577637 |
| ($A_{34}^{-1}$) 2.56049329 | ($A_{33}^{-1}$) −1.73615329 | ($A_{32}^{-1}$) −5.40756601 | ($A_{31}^{-1}$) 2.57198626 | ($A_{30}^{-1}$) 6.36838156 |
| ($A_{44}^{-1}$) 1.55514261 | ($A_{43}^{-1}$) −3.70959046 | ($A_{42}^{-1}$) 2.76418325 | ($A_{41}^{-1}$) 2.64165410 | ($A_{40}^{-1}$) −5.94850016 |
| ($A_{54}^{-1}$) 0.49319379 | ($A_{53}^{-1}$) −1.72067600 | ($A_{52}^{-1}$) 3.29337072 | ($A_{51}^{-1}$) −5.62295121 | ($A_{50}^{-1}$) 5.68268704 |

*Table 3 (Equal Width)*

| $a_4$ | $a_3$ | $a_2$ | $a_1$ | $a_0$ | B1 | B2 | B3 | B4 | B5 |
|---|---|---|---|---|---|---|---|---|---|
| 0 | 0 | 0 | 0 | 0 | 0 | −0 | 0 | −0 | 0 |
| 0 | 0 | 0 | 0 | 1 | 0.03479924 | −0.06313878 | 0.06790198 | −0.06317820 | 0.05196863 |
| 0 | 0 | 0 | 1 | 0 | 0.10529524 | −0.10703550 | 0.04237965 | 0.02194642 | −0.04439320 |
| 0 | 0 | 0 | 1 | 1 | 0.14009448 | −0.17017429 | 0.11028165 | −0.04123178 | 0.00757542 |
| 0 | 0 | 1 | 0 | 0 | 0.12882002 | −0.03351407 | −0.06173734 | 0.02097157 | 0.03520270 |
| 0 | 0 | 1 | 0 | 1 | 0.16361926 | −0.09665287 | 0.00616464 | −0.04220663 | 0.08717134 |
| 0 | 0 | 1 | 1 | 0 | 0.23411526 | −0.14054959 | −0.01935768 | 0.04291798 | −0.00919050 |
| 0 | 0 | 1 | 1 | 1 | 0.26891450 | −0.20368838 | 0.04854430 | −0.02026021 | 0.04277813 |
| 0 | 1 | 0 | 0 | 0 | 0.10253332 | 0.04619826 | −0.01258735 | −0.03710698 | −0.02433223 |
| 0 | 1 | 0 | 0 | 1 | 0.13733257 | −0.01694052 | 0.05531463 | −0.10028517 | 0.02763640 |
| 0 | 1 | 0 | 1 | 0 | 0.20782856 | −0.06083724 | 0.02979230 | −0.01516055 | −0.06872543 |
| 0 | 1 | 0 | 1 | 1 | 0.24262781 | −0.12397603 | 0.09769429 | −0.07833876 | −0.01675680 |
| 0 | 1 | 1 | 0 | 0 | 0.23135334 | 0.01268418 | −0.07432470 | −0.01613540 | 0.01087047 |
| 0 | 1 | 1 | 0 | 1 | 0.26615258 | −0.05045460 | −0.00642271 | −0.07931361 | 0.06283911 |
| 0 | 1 | 1 | 1 | 0 | 0.33664858 | −0.09435132 | −0.03194503 | 0.00581101 | −0.03352273 |
| 0 | 1 | 1 | 1 | 1 | 0.37144782 | −0.15749010 | 0.03595694 | −0.05736719 | 0.01844590 |
| 1 | 0 | 0 | 0 | 0 | 0.03879716 | 0.03420750 | 0.02677955 | 0.01793893 | 0.00922103 |
| 1 | 0 | 0 | 0 | 1 | 0.07359641 | −0.02893128 | 0.09468154 | −0.04523926 | 0.06118967 |
| 1 | 0 | 0 | 1 | 0 | 0.14409240 | −0.07282800 | 0.06915921 | 0.03988535 | −0.03517216 |
| 1 | 0 | 0 | 1 | 1 | 0.17889165 | −0.13596679 | 0.13706120 | −0.02329285 | 0.01679646 |
| 1 | 0 | 1 | 0 | 0 | 0.16761718 | 0.00069342 | −0.03495779 | 0.03891050 | 0.04442374 |
| 1 | 0 | 1 | 0 | 1 | 0.20241643 | −0.06244536 | 0.03294419 | −0.02426770 | 0.09639238 |
| 1 | 0 | 1 | 1 | 0 | 0.27291242 | −0.10634208 | 0.00742187 | 0.06085692 | 0.00003053 |
| 1 | 0 | 1 | 1 | 1 | 0.30771167 | −0.16948087 | 0.07532385 | −0.00232128 | 0.05199917 |
| 1 | 1 | 0 | 0 | 0 | 0.14133049 | 0.08040577 | 0.01419219 | −0.01916803 | 0.01511119 |
| 1 | 1 | 0 | 0 | 1 | 0.17612973 | 0.01726698 | 0.08209419 | −0.08234624 | 0.03685744 |
| 1 | 1 | 0 | 1 | 0 | 0.24662573 | −0.02662973 | 0.05657186 | 0.00277837 | −0.05950439 |
| 1 | 1 | 0 | 1 | 1 | 0.28142497 | −0.08976352 | 0.12447385 | −0.06039982 | −0.00753576 |
| 1 | 1 | 1 | 0 | 0 | 0.27015050 | 0.04689169 | −0.04754514 | 0.00180352 | 0.02009151 |
| 1 | 1 | 1 | 0 | 1 | 0.30494975 | −0.01624709 | 0.02035684 | −0.06137467 | 0.07206015 |
| 1 | 1 | 1 | 1 | 0 | 0.37544575 | −0.06014381 | −0.00516548 | 0.02374994 | −0.02430169 |
| 1 | 1 | 1 | 1 | 1 | 0.41024499 | −0.12328260 | 0.06273650 | −0.03942826 | 0.02766694 |

In Table 3 above, the values for $B_1$, $B_2$, $B_3$, $B_4$, and $B_5$ are seen to be different for each of the thirty-two unique combinations available with a five ring pattern. These $B_n$ values are invariant characteristics of the pattern and are measured by apparatus subsequently to be described, wherein the case of self-luminous patterns, they respectively represent the five mutual coherence factors $\pm|\Gamma(\rho_1)|$, $\pm|\Gamma(\rho_2)|$, $\pm|\Gamma(\rho_3)|$, $\pm|\Gamma(\rho_4)|$, and $\pm|\Gamma(\rho_5)|$ previously defined.

The general Equation 16 may also be used in developing formulas for calculating the values of matrix elements $A_{nk}$ for a five ring pattern where the rings all have equal areas. For this case, the outer radius $r$ of each ring can be expressed in terms of the maximum pattern radius $\alpha$ as follows: $r_1=\alpha\sqrt{1/5}$; $r_2=\alpha\sqrt{2/5}$; $r_3=\alpha\sqrt{3/5}$; and $r_4=\alpha\sqrt{4/5}$.

Therefore, the formula for determining elements $A_{10}$, $A_{20}$, $A_{30}$, $A_{40}$, and $A_{50}$ may be written in the form of Equation 18 as follows, with the limits of integration being the width of band $a_0$ in terms of $\alpha$ $$\Gamma_{a_0(\rho_n)}=\int_{\alpha\sqrt{4/5}}^{\alpha} r2\pi J_0(K\rho_n r)\,dr \qquad (25)$$

which reduces to $$\Gamma_{a_0(\rho_n)}=\pi\alpha^2\left[\frac{2J_1(K\alpha\rho_n)}{K\alpha\rho_n}-4/5\frac{2J_1(2/\sqrt{5}\rho_n)}{2/\sqrt{5}\rho_n}\right] \qquad (26)$$

Similarly, the equations for the remaining matrix elements $A_{nk}$ are developed as above.

$$\Gamma_{a_1(\rho_n)}=\pi\alpha^2\left[4/5\frac{2J_1(2/\sqrt{5}\rho_n)}{2/\sqrt{5}\rho_n}-3/5\frac{2J_1(\sqrt{3/5}\rho_n)}{\sqrt{3/5}\rho_n}\right] \qquad (27)$$

$$\Gamma_{a_2(\rho_n)}=\pi\alpha^2\left[3/5\frac{2J_1(\sqrt{3/5}\rho_n)}{\sqrt{3/5}\rho_n}-2/5\frac{2J_1(\sqrt{2/5}\rho_n)}{\sqrt{2/5}\rho_n}\right] \qquad (28)$$

$$\Gamma_{a_3(\rho_n)}=\pi\alpha^2\left[2/5\frac{2J_1(\sqrt{2/5}\rho_n)}{\sqrt{2/5}\rho_n}-1/5\frac{2J_1(\sqrt{1/5}\rho_n)}{\sqrt{1/5}\rho_n}\right] \qquad (29)$$

$$\Gamma_{a_4(\rho_n)}=1/5\frac{2J_1(\sqrt{1/5}\rho_n)}{\sqrt{1/5}\rho_n} \qquad (30)$$

Tables 4, 5, and 6 below show actual calculated values for the $A_{nk}$, $A_{nk}^{-1}$, and $B_n$ numbers when equal area five ring self-luminous patterns are to be recognized. As has been explained in connection with Tables 1, 2, and 3, however, the tabulated results here shown are to be interpreted in view of the same form conditions previously described, i.e., $K\alpha=1$, etc.

*Table 4 (Equal Area)*

| | | | | |
|---|---|---|---|---|
| ($A_{14}$) 0.17112274 | ($A_{13}$) 0.11906895 | ($A_{12}$) 0.07492670 | ($A_{11}$) 0.03789456 | ($A_{10}$) 0.00723203 |
| ($A_{24}$) 0.08177505 | ($A_{23}$) −0.04945012 | ($A_{22}$) −0.07837059 | ($A_{21}$) −0.05761968 | ($A_{20}$) −0.01961724 |
| ($A_{34}$) −0.00158850 | ($A_{33}$) −0.04851957 | ($A_{32}$) 0.03320865 | ($A_{31}$) 0.05669526 | ($A_{30}$) 0.02354066 |
| ($A_{44}$) −0.02621192 | ($A_{43}$) 0.03957589 | ($A_{42}$) 0.01653879 | ($A_{41}$) −0.04347006 | ($A_{40}$) −0.02586095 |
| ($A_{54}$) −0.00611744 | ($A_{53}$) 0.02077591 | ($A_{52}$) −0.03862757 | ($A_{51}$) 0.02477711 | ($A_{50}$) 0.02685892 |

*Table 5 (Equal Area)*

| | | | | |
|---|---|---|---|---|
| ($A_{14}^{-1}$) 3.68361500 | ($A_{13}^{-1}$) 7.08773798 | ($A_{12}^{-1}$) 8.65961254 | ($A_{11}^{-1}$) 6.76042771 | ($A_{10}^{-1}$) 3.10436699 |
| ($A_{24}^{-1}$) 1.54733114 | ($A_{23}^{-1}$) −10.36220193 | ($A_{22}^{-1}$) −24.44224811 | ($A_{21}^{-1}$) −19.49914718 | ($A_{20}^{-1}$) −5.33706892 |
| ($A_{34}^{-1}$) 4.37544203 | ($A_{33}^{-1}$) 24.71592259 | ($A_{32}^{-1}$) 76.99386787 | ($A_{31}^{-1}$) 92.11770058 | ($A_{30}^{-1}$) 38.08714056 |
| ($A_{44}^{-1}$) −5.93620920 | ($A_{43}^{-1}$) −69.10424614 | ($A_{42}^{-1}$) −169.49760628 | ($A_{41}^{-1}$) −218.28442383 | ($A_{40}^{-1}$) −110.49068356 |
| ($A_{54}^{-1}$) 11.41080630 | ($A_{53}^{-1}$) 108.92333508 | ($A_{52}^{-1}$) 287.96886826 | ($A_{51}^{-1}$) 350.46870041 | ($A_{50}^{-1}$) 198.76925087 |

*Table 6 (Equal Area)*

| $a_4$ | $a_3$ | $a_2$ | $a_1$ | $a_0$ | B1 | B2 | B3 | B4 | B5 |
|---|---|---|---|---|---|---|---|---|---|
| 0 | 0 | 0 | 0 | 0 | 0 | −0 | 0 | −0 | 0 |
| 0 | 0 | 0 | 0 | 1 | 0.00723203 | −0.01961724 | 0.02354066 | −0.02586095 | 0.02685892 |
| 0 | 0 | 0 | 1 | 0 | 0.03789456 | −0.05761968 | 0.05609526 | −0.04347006 | 0.02477711 |
| 0 | 0 | 0 | 1 | 1 | 0.04512659 | −0.07723693 | 0.07963593 | −0.06933101 | 0.05163604 |
| 0 | 0 | 1 | 0 | 0 | 0.07492670 | −0.07837059 | 0.03320865 | 0.01653879 | −0.03862757 |
| 0 | 0 | 1 | 0 | 1 | 0.08215872 | −0.09798784 | 0.05674931 | −0.00932215 | −0.01176865 |
| 0 | 0 | 1 | 1 | 0 | 0.11282126 | −0.13599028 | 0.08930390 | −0.02693127 | −0.01385045 |
| 0 | 0 | 1 | 1 | 1 | 0.12005328 | −0.15560753 | 0.11284457 | −0.05279222 | 0.01300847 |
| 0 | 1 | 0 | 0 | 0 | 0.11906895 | −0.04945012 | −0.04851957 | 0.03957589 | 0.02077591 |
| 0 | 1 | 0 | 0 | 1 | 0.12630098 | −0.06906737 | −0.02497890 | 0.01371494 | 0.04763484 |
| 0 | 1 | 0 | 1 | 0 | 0.15696352 | −0.10706981 | 0.00757569 | −0.00389417 | 0.04555304 |
| 0 | 1 | 0 | 1 | 1 | 0.16419554 | −0.12668706 | 0.03111635 | −0.02975512 | 0.07241196 |
| 0 | 1 | 1 | 0 | 0 | 0.19399565 | −0.12782072 | −0.01531091 | 0.05611468 | −0.01785165 |
| 0 | 1 | 1 | 0 | 1 | 0.20122767 | −0.14743797 | 0.00822974 | 0.03025373 | 0.00900727 |
| 0 | 1 | 1 | 1 | 0 | 0.23189022 | −0.18544041 | 0.04078434 | 0.01264462 | 0.00692546 |
| 0 | 1 | 1 | 1 | 1 | 0.23912224 | −0.20505765 | 0.06432500 | −0.01321632 | 0.03378439 |
| 1 | 0 | 0 | 0 | 0 | 0.17112274 | 0.08177505 | −0.00158850 | −0.02621192 | −0.00611744 |
| 1 | 0 | 0 | 0 | 1 | 0.17835477 | 0.06215780 | 0.02195216 | −0.05207288 | 0.02074147 |
| 1 | 0 | 0 | 1 | 0 | 0.20901731 | 0.02415536 | 0.05450676 | −0.06968199 | 0.01865967 |
| 1 | 0 | 0 | 1 | 1 | 0.21624933 | 0.00453812 | 0.07804742 | −0.09554294 | 0.04551859 |
| 1 | 0 | 1 | 0 | 0 | 0.24604944 | 0.00340445 | 0.03162014 | −0.00967313 | −0.04474502 |
| 1 | 0 | 1 | 0 | 1 | 0.25328147 | −0.01621279 | 0.05516081 | −0.03553408 | −0.01788609 |
| 1 | 0 | 1 | 1 | 0 | 0.28394400 | −0.05421523 | 0.08771540 | −0.05314320 | −0.01996790 |
| 1 | 0 | 1 | 1 | 1 | 0.29117603 | −0.07383247 | 0.11125607 | −0.07900415 | 0.00689102 |
| 1 | 1 | 0 | 0 | 0 | 0.29019170 | 0.03232493 | −0.05010807 | 0.01336396 | 0.01465847 |
| 1 | 1 | 0 | 0 | 1 | 0.29742373 | 0.01270768 | −0.02656741 | −0.01249699 | 0.04151739 |
| 1 | 1 | 0 | 1 | 0 | 0.32808626 | −0.02529476 | 0.00598718 | −0.03010610 | 0.03943559 |
| 1 | 1 | 0 | 1 | 1 | 0.33531829 | −0.04491200 | 0.02952785 | −0.05596705 | 0.06629451 |
| 1 | 1 | 1 | 0 | 0 | 0.36511840 | −0.04604567 | −0.01689942 | 0.02990276 | −0.02396910 |
| 1 | 1 | 1 | 0 | 1 | 0.37235042 | −0.06566291 | 0.00664124 | 0.00404181 | 0.00288982 |
| 1 | 1 | 1 | 1 | 0 | 0.40301296 | −0.10366536 | 0.03919584 | −0.01356730 | 0.00080802 |
| 1 | 1 | 1 | 1 | 1 | 0.41024499 | −0.12328260 | 0.06273650 | −0.03942826 | 0.02766694 |

Figure 4:
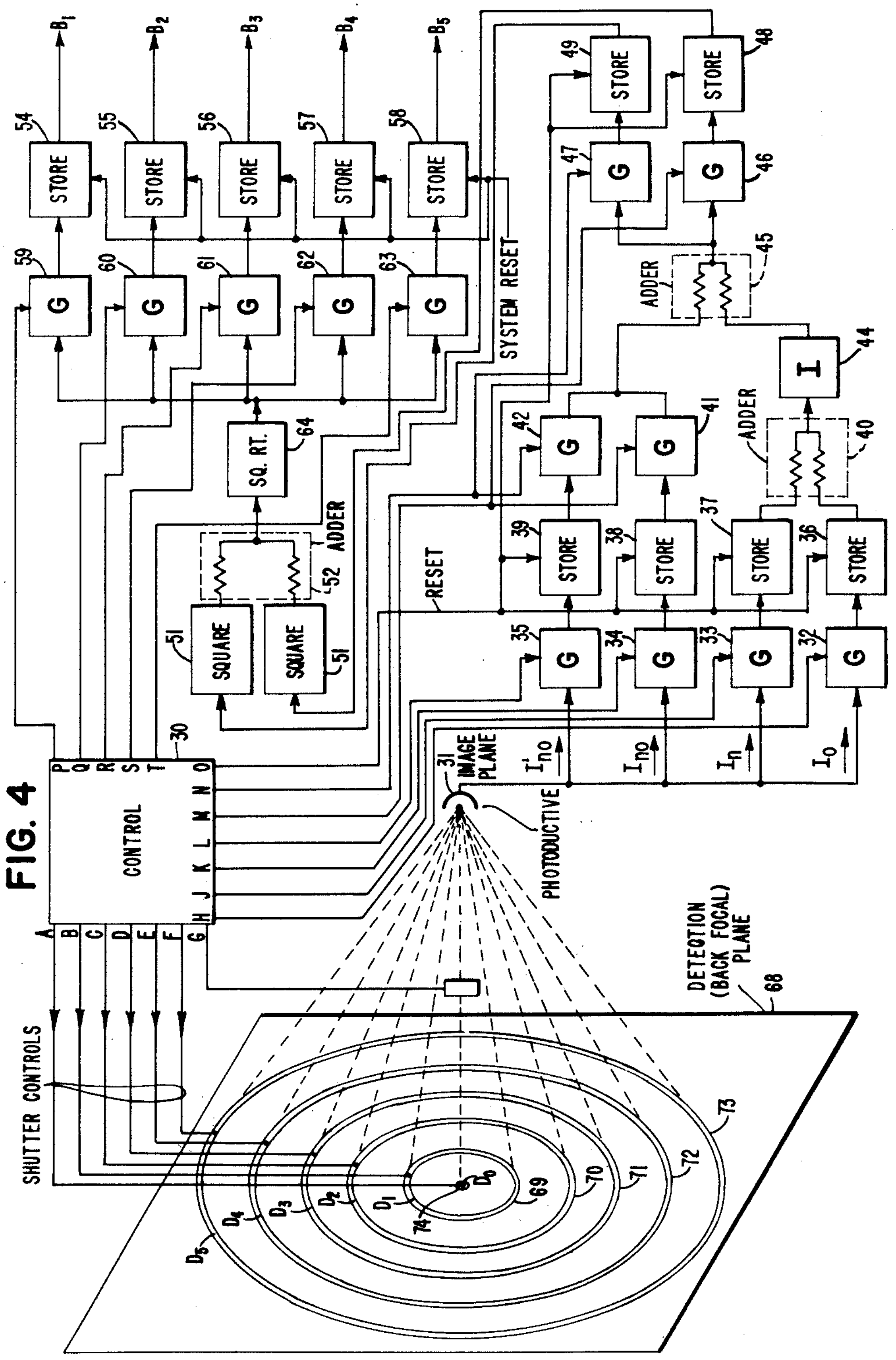
FIGURES 4 and 5 show a first embodiment for measuring the invarient characteristics of a self-luminous pattern.

In FIGURE 4 of the drawings is disclosed one embodiment whereby the measurement of the values $$|\Gamma_{(\rho_n)}|$$

may be accomplished. These circuits may be used as unit 4 in FIGURE 1. FIGURE 4 shows a pictorial view of the detection (back focal) plane of FIGURE 1 at which an opaque screen 68 is placed having a series of concentric annular slits 69 through 73 correspond in radius $\rho_n$ to the detector rings shown in FIGURE 3. A center hole 74 is also provided. Inserted either within or directly adjacent each slit is an annular light shutter $D_n$. For example, the center hole 74 of the detector plane has associated therewith a light shutter $D_0$ which controls the amount of light passing therethrough. The next innermost annular slit 69 has associated therewith a light shutter $D_1$. Shutters $D_2$, $D_3$, $D_4$, $D_5$ are likewise associated with annular concentric slits 70, 71, 72, and 73, respectively. A light shutter $D_n$ may comprise a series of annularly arranged Kerr electro-optical cells, which are responsive to an electrical signal for varying their degree of opaqueness to light. Alternatively, a shutter $D_n$ may be mechanical in nature for controlling the passage of light through a slit. Shutters $D_0$ through $D_5$ are selectively opened and closed by means of signals emanating from a control unit 30, the structure of which will later be described.

A single photo-detector 31 is placed on a line normal to center shutter $D_0$ and at the image plane behind the opaque screen 68 in FIGURE 4. This photo-detector 31 is on the opposite side of screen 68 from the pattern plane 1 in FIGURE 1, and is responsive to light from the pattern being transmitted through any of the opened slits, such that its output signal is proportional to the total intensity stirring thereon. Between photo-detector 31 and center shutter $D_0$ is placed a device 65 which, when actuated by a signal from control unit 30, shifts the phase of any light coming through center hole 74 by ninety degrees before it reaches photo-detector 31. Such a device may consist of the standard optical one-quarter wave plate which is selectively inserted into the path of the beam. The output of photo-detector 31 is applied to gates 32, 33, 34, and 35, which in turn feed respective storage circuits 36, 37, 38, 39. Gates 32 through 35 are selectively energized by control signals from unit 30 in order to respectively store in units 36 through 39 the signals $I_0$, $I_n$, $I_{n0}$, and $I_{n0}'$ which will next be defined.

Before describing the remaining circuitry in FIGURE 4, an analysis will be made of the use to which the signals from photo-detector 31 are put. Initially, only the light shutter $D_0$ is opened to admit light from the pattern to pass therethrough and fall on detector 31. A signal $I_0$ is generated by this detector which is proportional to the intensity of the incident light thereon. Next, a shutter $D_n$ is opened and shutter $D_0$ closed, so that detector 31 generates a signal $I_n$. Shutters $D_0$ and $D_n$ are then both opened, and the resulting photo-detector signal is represented by $I_{n0}$. While shutters $D_0$ and $D_n$ are both opened, the one-quarter wave plate 63 is activated and operates upon the light passing through $D_0$ to shift its phase 90° so that a signal $I_{n0}'$ is generated by 31. The two signals $I_{n0}$ and $I_{n0}'$ are to be defined as follows:

$$I_{n0}=I_0+I_n+2[\Gamma_{(\rho_n)}]^R \quad (31)$$

$$I_{n0}'=I_0+I_n+2[\Gamma_{(\rho_n)}]^I \quad (32)$$

where $$[\Gamma_{(\rho_n)}]^R$$

and $$[\Gamma_{(\rho_n)}]^I$$

represent the real and imaginary parts of the mutual coherence factor

Now, $$[\Gamma_{(\rho_n)}]^R=1/2(I_{n0}-I_0-I_n) \quad (33)$$

$$[\Gamma_{(\rho_n)}]^I=1/2(I_{n0}'-I_0-I_n) \quad (34)$$

and the square of the absolute value of $$\Gamma_{(\rho_n)}$$

is $$|\Gamma_{(\rho_n)}|^2=([\Gamma_{(\rho_n)}]^R)^2+([\Gamma_{(\rho_n)}]^I)^2 \quad (35)$$

Therefore, the value $$|\Gamma_{(\rho_n)}|$$

may be ascertained by taking the square root of Equation 35. For a complete explanation of the above theory, reference may be made to "An Aspect of Information Theory In Optics," Hideya Gamo, IRE International Convention Record 1960, pages 189–203.

Returning now to FIGURE 4, the outputs from store units 36 and 37 are applied to a summing network 40 where they are added together. The output from 40 is next inverted (changed in sign) by 44 and applied to another summing network 45. The other input to adder 45 is applied from either store unit 38 or 39 in accordance with which of the gates 41 or 42 is conditioned by control signals from unit 30. Thus, adder 40 adds together $I_0$ and $I_n$ with this sum being successively subtracted from $I_{n0}$ and $I_{n0}'$ which are stored in units 38 and 39, respectively. The components in adder network 45 may be proportioned so that the outputs therefrom are actually one-half of the differences $I_{n0}-(I_0+I_n)$ and $I_{n0}'-(I_0+I_n)$ in order to comply with the requirements of Equations 33 and 34, respectively. The outputs from adder 45, which are respectively equal to the real and imaginary parts of the mutual coherence factor $$\Gamma_{(\rho_n)}$$

are fed through respective gates 46 and 47 to store units 48 and 49. Thus, the real part of the mutual coherence factor $$\Gamma_{(\rho_n)}$$

is initially stored in unit 48, and then the imaginary part is stored in unit 49. The outputs from these two storage units are subsequently transmitted via squaring units 50 and 51 to the input of adder 52, which mechanizes the function of Equation 35. The output from adder 52 is then sent to a square root unit 64 whose output is then applied to one of the storage units 55 through 58 via associated gates 59 through 63, respectively. The signal placed in one of the units 54 through 58 thus represents the value of $$|\Gamma_{(\rho_n)}|$$

and is termed $B_n$.

Figure 5:
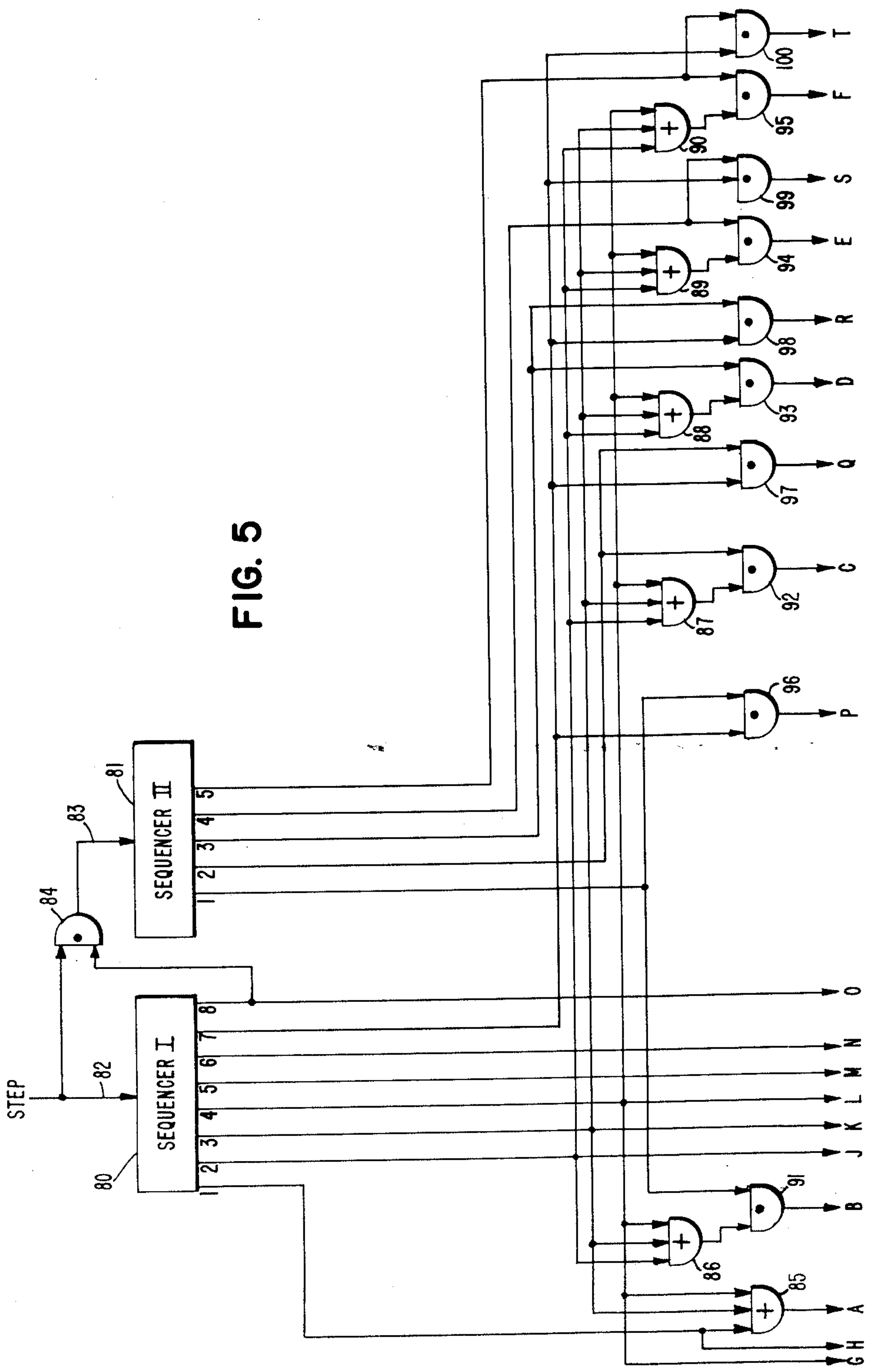

FIGURE 5 discloses details of circuit 30 which generates signals A through T used in FIGURE 4 to control the components therein. As will be appreciated from the above discussion, only one set of signals $I_0$, $I_n$, $I_{n0}$, and $I_{n0}$ can be generated at a time. For example, detector shutters $D_0$ and $D_1$ may be selectively opened singly and in combination to produce signals $I_0$, $I_1$, $I_{10}$ and $I_{10}'$ which then may be mathematically combined to produce $$|\Gamma_{(\rho_1)}|$$

at the output of store unit 54. Subsequently, detector shutters $D_0$ and $D_2$ may be operated, followed by the pairs of shutters $D_0$—$D_3$, $D_0$—$D_4$, and $D_0$—$D_5$ in this order. Therefore, where there are five detector rings $D_1$ through $D_5$, there must be five distinct cycles in order to obtain five sets of respective signals $I_0$, $I_1$, $I_{10}$, $I_{10}'$ through $I_0$, $I_5$, $I_{50}$, $I_{50}'$, each of which is used to calculate the respective signals $B_1$ through $B_5$. In practice, there need be only one measurement of $I_0$ at the beginning of the recognition period since this same value is used in all five cycles. However, for purposes of standardizing each cycle as much as possible, the apparatus of FIGURE 5 causes shutter $D_0$ to open for each of the above signal sets.

In FIGURE 5, two sequence circuits 80 and 81, respectively designated I and II, cooperate in order to successively generate pairs of signals B—P, C—Q, D—R, E—S, and F—T, each pair being unique to the cycles in which signals $B_1$ through $B_5$ are generated, respectively. Sequence I provides during each of the five cycles, successive signals on eight output conductors 1 through 8, there being only one signal present at a time. Sequencer II provides, during each of the five cycles, a different signal on but one of its output conductors 1 through 5. Sequencer I is stepped each time that it receives a step pulse (generated by an oscillator or the like) at terminal 82, but Sequencer II requires the presence of both a step pulse and a signal from conductor 8 (Sequencer I) at AND gate 84 in order to change its condition. Thus, Sequencer II is stepped once for each eight steps of Sequencer I, which in turn recycles to its step 1 after completing its step 8.

Output conductor 1 of Sequencer I is connected to OR gate 85 to generate the control signal A each time a signal appears thereon. In addition, a signal H is produced at this time. From FIGURE 4, it will be seen that signal A opens shutter $D_0$, thus producing $I_0$ from photo-detector 31, while signal H conditions gate 32 to pass $I_0$ into store 36. These two operations must occur during each of the five cycles mentioned above. Conductor 2 of Sequencer I is connected to a set of OR gates 88 through 90 for purposes of energizing one terminal of each of a set of AND gates 91 through 95, respectively, which in turn respectively, produce signals B through F. The other terminal of each AND gate 91 through 95 is energized by a different one of the output conductors from Sequencer II, such that only one of the signals B through F can be present during each cycle. Since these signals respectively open shutters $D_1$ through $D_5$, it is seen that only one shutter $D_n$ together with shutter $D_0$ can be operated during a cycle. Output conductor 3 of Sequencer I is connected in common to OR gates 85 through 90, as is output conductor 4. Signals appearing on either one of these conductors, therefore, open simultaneously shutter $D_0$ and a shutter $D_n$, the latter depending upon which conductor of Sequencer II is energized in the cycle. Sequencer I conductor 4 also produces signal G for energizing the one-quarter wave plate 65. Therefore, the first four steps of Sequencer I occurring each cycle results in the successive generation of signals $I_0$, $I_n$, $I_{n0}$, and $I_{n0}'$ by photo-detector 31, with the subscript $n$ being determined by the particular condition of Sequencer II in each cycle. In addition, steps 1 through 4 of Sequencer I also generate signals H, J, K and L, respectively, to condition gates 32 through 35.

Continuing with the steps of Sequence I during each cycle, the signals appearing in succession on conductors 5 and 6 cause gates 41—46, and 42—47 to open. Since these arithmetic operations, represented by respective Equations 33 and 34, must be performed during each cycle, there is no control exerted by Sequencer II over signals M and N. Conductor 7 of Sequencer I is connected in common to AND gates 96 through 100, each of which also has another input from a respective one of conductors 1 through 5 of Sequencer II. Thus, when step 7 of Sequencer I occurs during each cycle, only one of the signals P through T is generated according to the state of Sequencer II. Step 8 of Sequencer I subsequently resets store units 36, 37, 38, 39, 48, and 49, to prepare them for the next following cycle when signals $I_0$, $I_{n+1}$, $I_{(o+1)0}$, and $I_{(n+1)0}$ are to be generated and stored. As previously described, the signal on conductor 8 also prepares AND gate 81 to pass a step pulse to Sequencer II.

In FIGURES 4 and 5, the details of each component functionally described are well-known in the prior art, particularly in analog and digital computer technology. The system shown may be completely analog in nature, or an analog to digital converter might be used if desired to obtain digital representations of the signals $I_0$, $I_n$, $I_{n0}$ and $I_{n0}'$ generated by photo-detector 31, after which all mathematical operations thereon are carried out by well-known digital components and circuits. For these reasons, the details of FIGURES 4 and 5 will not be spelled out, inasmuch as it is within the skill of one versed in the art to construct the system shown without exercise of invention.

A brief description will now be given of the operation of FIGURES 4 and 5. At the beginning, stage 1 in Sequencer I is set on so that light gate $D_0$ is energized to pass light from the pattern therethrough. Sequencer II is also in its first condition. This light is detected by 31, and the output signal $I_0$ therefrom is transmitted via gate 32 to storage unit 36 where stored. It will be noted that stage 1 of Sequencer I is also directed to gate 32 to pass this signal to the appropriate store. Sequencer I is now stepped to its second stage which energizes shutter $D_1$ to generate the signal $I_1$ from photo-detector 31. This value is transmitted via gate 33 to store 37. Stage 3 of Sequencer I next opens both shutters $D_0$ and $D_1$ in order that 31 can generate the signal $I_{10}$ which is to be stored in unit 38 via gate 34. At stage 4 of Sequencer I, the one-quarter wave plate 65 is energized together, with shutters $D_0$ and $D_1$, so that the signal $I_{10}'$ may be generated and stored in unit 39 via gate 35. At Step 5 of Sequencer I, gate 41 is energized to pass the output from store 38 to adder 45 where it is summed with the negative value of the output from adder 40. Thus, the output appearing from adder 45 at this time is the real part of the coherence factor $\Gamma_{(\rho_1)}$ which is thereupon stored in unit 48 via gate 46. Subsequently, stage 6 of Sequencer I causes the output from store 39 applied to adder 45 and there summed with the negative output of adder 40, with the result passing through gate 47 to store 49. The result from adder 45 at this time is the imaginary portion of $\Gamma_{(\rho_1)}$. The outputs from units 48 and 49 are respectively squared in units 50 and 51, whose outputs are applied to adder 52 with the result being the value of $|\Gamma_{(\rho_1)}|^2$. The square root of this quantity is taken by unit 64, and passed through gate 59 to store 54, where it is available as signal $B_1$ having the universal values shown in Table 3 or 6 if five ring equal area or equal width patterns are at the pattern plane. Stage 8 of Sequencer I next resets the indicated stores so that they are prepared to receive the signals $I_0$, $I_2$, $I_{20}$, $I_{20}'$, etc. next to be generated.

Upon Sequencer I recycling back to its step 1, Sequencer II is advanced to its step 2 in order to allow shutter $D_2$ and gate 60 to be operated as Sequencer I repeats its eight steps. Thus, the value $|\Gamma_{(\rho_2)}|$ is placed in Store 55 at the end of the second measuring cycle, which is subsequently termed $B_2$. In measuring cycles 3, 4, and 5, similar operations result in values $|\Gamma_{(\rho_3)}|$, $|\Gamma_{(\rho_4)}|$, and $|\Gamma_{(\rho_5)}|$ being stored in units 56, 57, and 58, respectively.

Figures 6, 7:
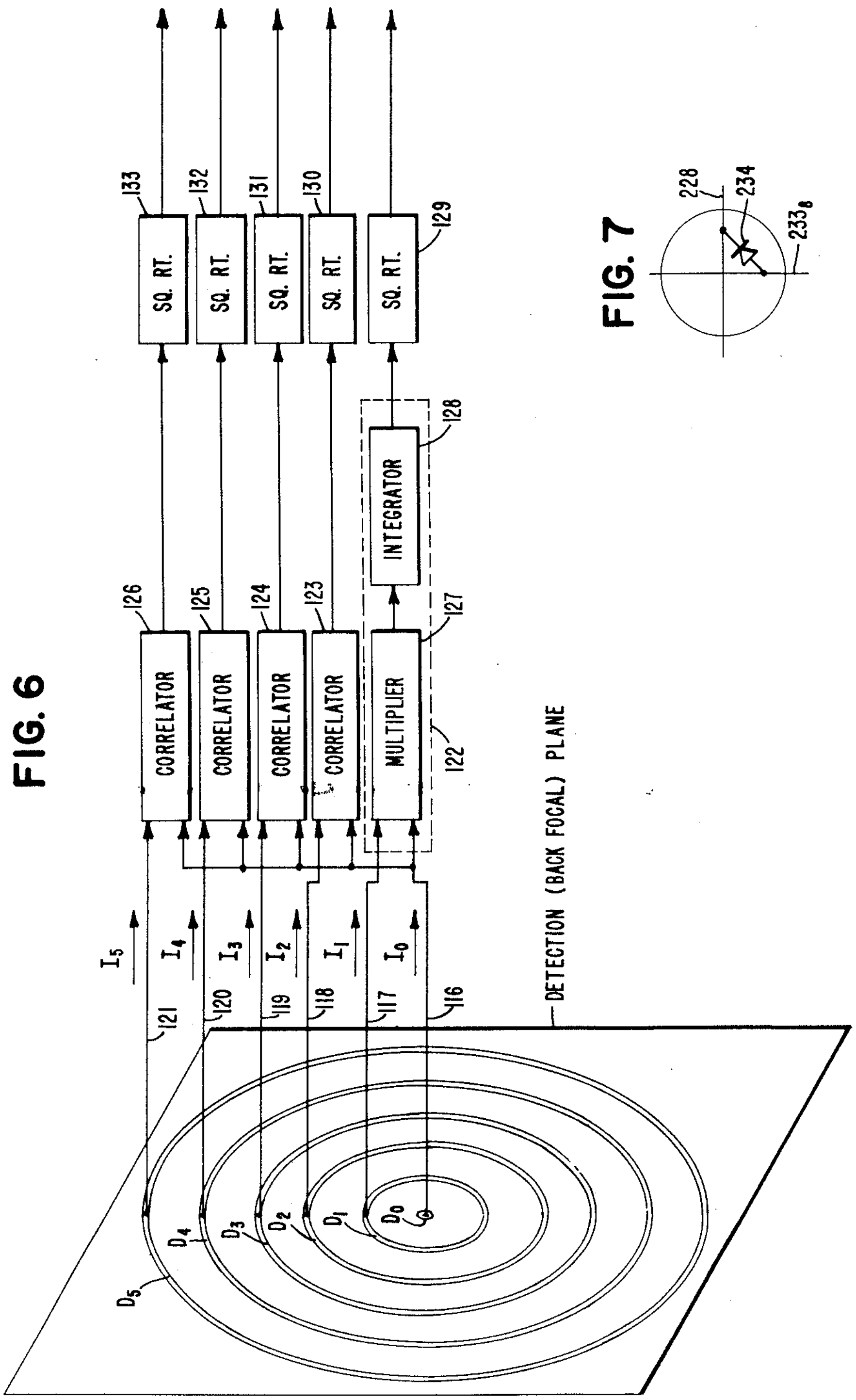
FIGURE 6 shows a second embodiment for measuring the invariant characteristics of a self-luminous pattern.
FIGURE 7 shows a detail of FIGURES 8 and 9.

Figure 6 of the drawings discloses alternative apparatus for generating signals $B_1$–$B_5$ when the patterns are self-luminous. This structure utilizes the Hanbury Brown-Twiss effect which is disclosed in The Proceedings of the Royal Society of London, vol. A242, pages 300–324 (1957), and vol. A243, pages 291–319 (1957). In these publications, the authors state the general proposition that when two light beams from a coherent or partially coherent source are respectively incident on two photo-detectors at respective positions 1 and 2, the correlation between the signals generated by said photo-detectors is proportional to the square of the absolute value of the mutual coherence factor of the beams as measured at the photo-detector positions. The correlation between any two signals is found by integrating their product over a finite time. Thus, when the signals from two photo-detectors are multiplied together and this product integrated the result is the correlation coefficient of the signals which is proportional to the value of $|\Gamma_{12}|^2$. Apparatus is shown in these publications for performing the above described calculations, with the name "intensity interferometer" given thereto.

In FIGURE 6, a group of concentric ring detectors $D_1$ through $D_5$, together with a center detector $D_0$, are placed at the back focal plane 115. Each detector ring $D_n$ has a corresponding radius $\rho_n$ calculated from the sampling Equations 14 or 15, and each is made of photo-conductive material such that when exposed to light, a signal (current $I_n$) is generated therein whose magnitude is proportional to the intensity of the incident light thereon. A group of conductors 116 through 121 are respectively connected one each to detectors $D_0$ through $D_5$ whereon appear the respective signals $I_0$ through $I_5$. Signal $I_0$ is applied to one input of each of a group of correlation circuits 122 through 126, while signals $I_1$ through $I_5$ are respectively applied one each to the other inputs of correlators 122 through 126. Each correlation circuit, as may be observed from the details of correlator 122, is comprised of a multiplier unit 127 which continuously forms the product of input signals $I_0$ and $I_n$, together with unit 128 for integrating said product with respect to time. Such correlators are well-known in the prior art, although the above identified Hanbury Brown-Twiss publications may be consulted for further details.

The outputs from correlators 122 through 126 are respectively applied to square root units 129 through 133, from which emerge respective signals $B_1$ through $B_5$. Signals $B_1$ through $B_5$ have representative values shown by Table 3 or 6 when five ring patterns of equal width or area are being scanned.

In operation, a self-luminous pattern is placed at pattern plane 1 in FIGURE 1 and light therefrom falls on the detectors $D_0$ through $D_5$ in FIGURE 6. Signals $I_0$ through $I_5$ are thereby generated. Correlator 122 and detectors $D_0$ and $D_1$ comprise a Hanbury Brown-Twiss intensity interferometer which produces an output proportional to the value of $$|\Gamma_{(\rho_1)}|^2$$

i.e., to the square of the absolute value of the mutual coherence factor of the light beams incident at detectors $D_0$ and $D_1$. The square root of this value is taken by unit 129.

In like manner, correlator 123 and detectors $D_0$ and $D_2$ comprise another Hanbury Brown-Twiss interferometer for generating the value $$|\Gamma_{(\rho_2)}|^2$$

the square root of which is then taken by unit 130. Correlators 124, 125, and 126 respectively produce $$|\Gamma_{(\rho_3)}|^2$$

$$|\Gamma_{(\rho_4)}| \text{ and } |\Gamma_{(\rho_5)}|^2$$

since they also comprise respective parts of three more Hanbury Brown-Twiss interferometers.

When compared with FIGURE 4, it will be appreciated that the apparatus of FIGURE 6 produces signals $B_1$ through $B_5$ at the same time instead of sequentially. However, it is also obvious that a single correlator could be used in FIGURE 6 if one of its inputs were to be successively connected with detectors $D_1$ through $D_5$, thereby resulting in an equipment gain through loss of speed.

As previously noted in connection with Tables 1 through 6, the values there shown for $A_{nk}$, $A_{nk}^{-1}$, and $B_n$ were calculated without considering, among other things, the particular construction of the detecting mechanism. In FIGURE 4, the total wave amplitude of light passing through an open shutter $D_n$ is equal to the wave amplitude at an incremental point thereon, multiplied by the detector circumference $2\pi\rho_n$. Since the intensity of a beam is equal to the square of its wave amplitude, it is seen that the output of photo-detector 31 due to light through shutter $D_n$ is proportional to $(2\pi\rho_n)^2$. Therefore, since the square root of $$|\Gamma_{(\rho_n)}|^2$$

is obtained, the value $2\pi\rho_n$ must be considered. In Tables 1 through 6, the values there shown should consequently be multiplied by the corresponding constants $2\pi\rho_n$ when the measuring apparatus of FIGURE 4 is employed. However, in FIGURE 6, the wave amplitude of light striking each incremental area of a photo-detector $D_n$ causes the generation of a number of signals each proportional to the intensity of the light at corresponding areas. The sum of these signals over the circumference $2\pi\rho_n$ results in the final output $I_n$ from detector $D_n$. Again, since the square root of $$|\Gamma_{(\rho_n)}|^2$$

is taken, then the value $\sqrt{2\pi\rho_n}$ must be considered, such that the corresponding values in Tables 1 through 6 must be multiplied thereby when the measuring apparatus of FIGURE 6 is used. It should also be added here, however, that the detector rings used with the correlators in FIGURE 6 can be modified so as to more closely resemble those used in FIGURE 4. For example, if concentric slits are provided at the detection plane, a separate bundle of Lucite tubes for each slit may be used whose ends are arranged adjacent each other and completely around the slit to conduct the light falling thereon to a respective photo-detector, which in turn is connected to one input of a correlator circuit. Thus, slits $D_1$ through $D_5$ would be respectively associated one with a group of five photo-detectors, each of which would be respectively connected one with the group of correlators 122 through 126. A photo-detector would also be provided for the center hole $D_0$ which in turn would be connected to all of the correlators. In such a modified arrangement of FIGURE 6, the effect produced, as regards the summation of wave amplitude around the periphery of the slit before the light impinges on a photo-sensitive surface, is similar to that observed in connection with FIGURE 4. Therefore, where a single photo-detector together with light transmission conductors are substituted in FIGURE 6 for each ring of photo-conductive material, the constants $2\pi\rho_n$ should be used to accordingly modify the values in Tables 1 through 6.

Before describing the circuits of FIGURES 8 and 9, which perform the mathematical operations indicated by Equations 8, a brief analysis will be made of the effect that the signs of the values $$|\Gamma_{(\rho_n)}|$$

have on the calculations. As can be discerned from Table 3 or 6, many of the $$|\Gamma_{(\rho_n)}|$$

values for different patterns must have a negative sign attributed thereto in order that the calculated bits $a_0$ through $a_4$ fall within the valid ranges of 0 or +1. However, the circuits of FIGURE 4 and FIGURE 6 both measure the square of the absolute phase coherence factor $$|\Gamma_{(\rho_n)}|^2$$

from which the value $$|\Gamma_{(\rho_n)}|$$

is calculated by a square root routine. Thus, the actual sign of $$|\Gamma_{(\rho_n)}|$$

is not known since the actual measured value $$|\Gamma_{(\rho_n)}|^2$$

is obviously always positive. Therefore, in using the signals $B_n$ from FIGURE 4 or FIGURE 6, signs must be assumed for each and the calculations performed. If one or more signs are incorrect, however, then one or more of the calculated bits $a_0$ through $a_4$ will have a value other than 0 or +1. If invalid bits are so obtained, then a different sign for one or more of the signals $B_n$ must be assumed, and the calculations repeated. The changing of the sign combinations continues until valid values for all bits $a_0$ through $a_4$ are obtained.

Since five signals $B_n$ are obtained when recognizing the patterns shown in the particular embodiments, it is seen that there could be a maximum of thirty-two different sign combinations which range from $+B_1$, $+B_2$, $+B_3$, $+B_4$, $+B_5$ to $-B_1$, $-B_2$, $-B_3$, $-B_4$, $-B_5$. An orderly procedure for changing the sign combinations would therefore be one in which a binary progression is followed, i.e., +++++, then ++++−, followed by +++−+, +++−−, ++−++, etc. However, in examining Tables 3 and 6, it is noted that not all of the sign combinations are present, and that patterns with different decimal significance may have the same sign combination for their $B_n$ values. For example, in Table 3, the values $B_1$ through $B_5$ have respective signs +, −, +, −, and + for all of the following patterns, each expressed in decimal: 0, 1, 3, 5, 7, 9, 15, 17, 19, 21, 23, 29, and 31. Thus if this particular sign combination is assumed then valid bits $a_0$ through $a_4$ would be calculated if the pattern being sensed were any of the above, In like fashion patterns 6, 14, and 30 all produce $B_1$ through $B_5$ values having respective signs +, −, −, +, and −. Table 7 below gives in full the number of sign combinations required to recognize any one of thirty-two unique equal width concentric ring patterns, while Table 8 gives the number of sign combinations required to recognize a like number of equal area patterns.

*Table 7 (Equal Width)*

| Step | Number of patterns recognized | Signs | | | | |
|---|---|---|---|---|---|---|
| | | $B_1$ | $B_2$ | $B_3$ | $B_4$ | $B_5$ |
| 1 | 13 | + | − | + | − | + |
| 2 | 3 | + | − | + | − | − |
| 3 | 3 | + | − | + | + | − |
| 4 | 3 | + | − | − | + | − |
| 5 | 2 | + | + | − | + | + |
| 6 | 1 | + | + | + | + | + |
| 7 | 1 | + | + | + | − | + |
| 8 | 1 | + | + | + | − | − |
| 9 | 1 | + | + | − | − | − |
| 10 | 1 | + | + | − | − | + |
| 11 | 1 | + | − | − | − | + |
| 12 | 1 | + | − | − | + | + |
| 13 | 1 | + | − | + | + | + |

*Table 8 (Equal Area)*

| Step | Number of patterns recognized | Signs | | | | |
|---|---|---|---|---|---|---|
| | | $B_1$ | $B_2$ | $B_3$ | $B_4$ | $B_5$ |
| 1 | 13 | + | − | + | − | + |
| 2 | 4 | + | − | + | − | − |
| 3 | 3 | + | + | + | − | + |
| 4 | 3 | + | − | + | + | + |
| 5 | 2 | + | − | − | + | + |
| 6 | 2 | + | − | − | + | − |
| 7 | 1 | + | − | + | + | − |
| 8 | 1 | + | + | − | − | − |
| 9 | 1 | + | + | − | − | + |
| 10 | 1 | + | + | − | + | + |
| 11 | 1 | + | + | + | − | − |

In comparing Tables 7 and 8, it is noted that the value $$B_1(|\Gamma_{(\rho_1)}|)$$

always is positive. Furthermore, only eleven sign combinations are required to recognize all of the equal area patterns, whereas thirteen combinations are necessary to insure that all of the equal width patterns are recognizable. However, if the sign change sequence followed a straight binary progression, then more steps would be required. It is also interesting to note that twenty-seven patterns can be recognized in the first six steps of Table 8 as compared to twenty-five patterns in the first six steps of Table 7. Therefore, given any particular binary pattern, the chances are that fewer calculation steps will be required for its identification if said pattern has equal area rings.

Figure 8A:
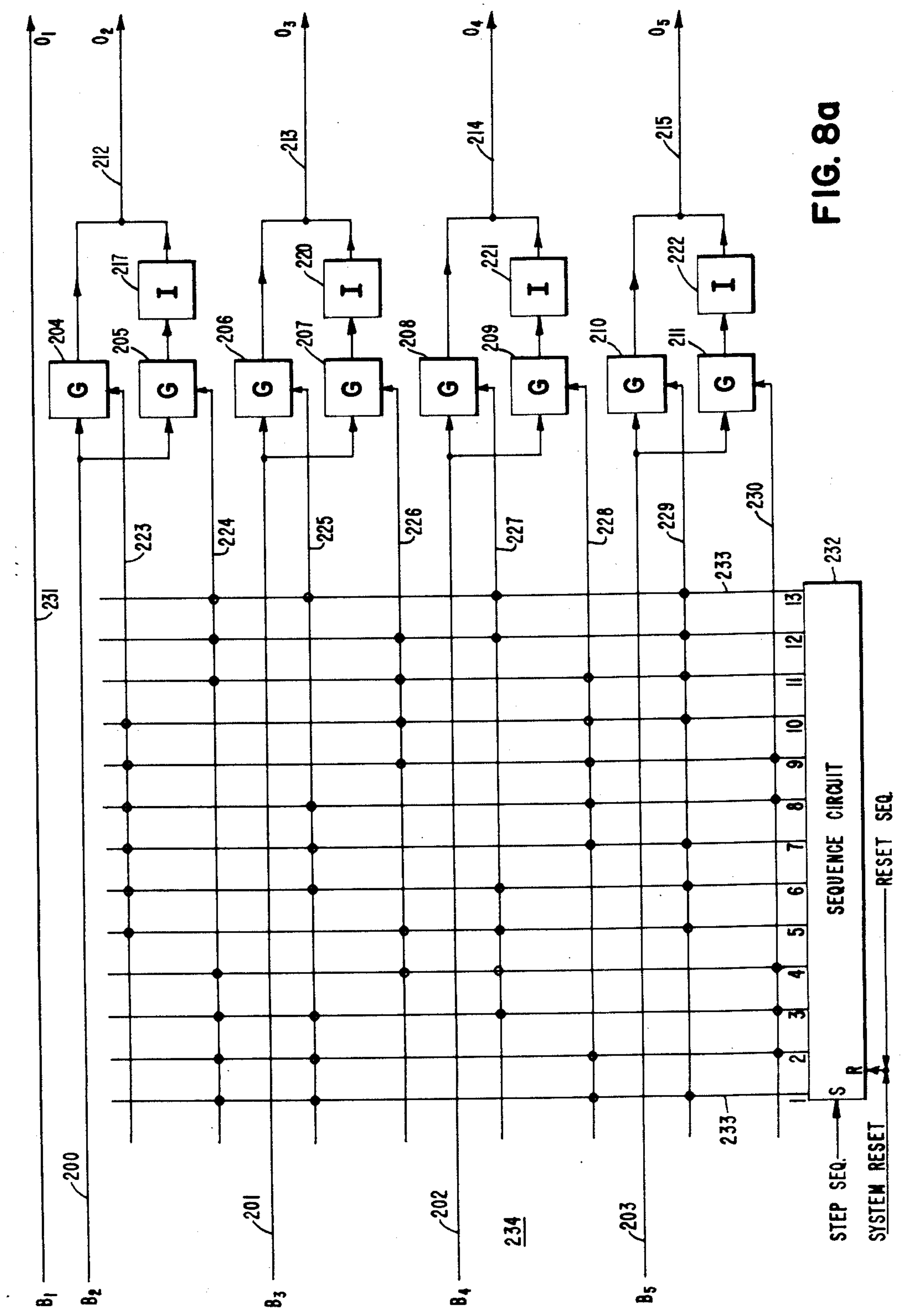
FIGURE 8 shows a first embodiment for calculating the binary bits representing a pattern from its measured invariant characteristics.
Figure 8B:
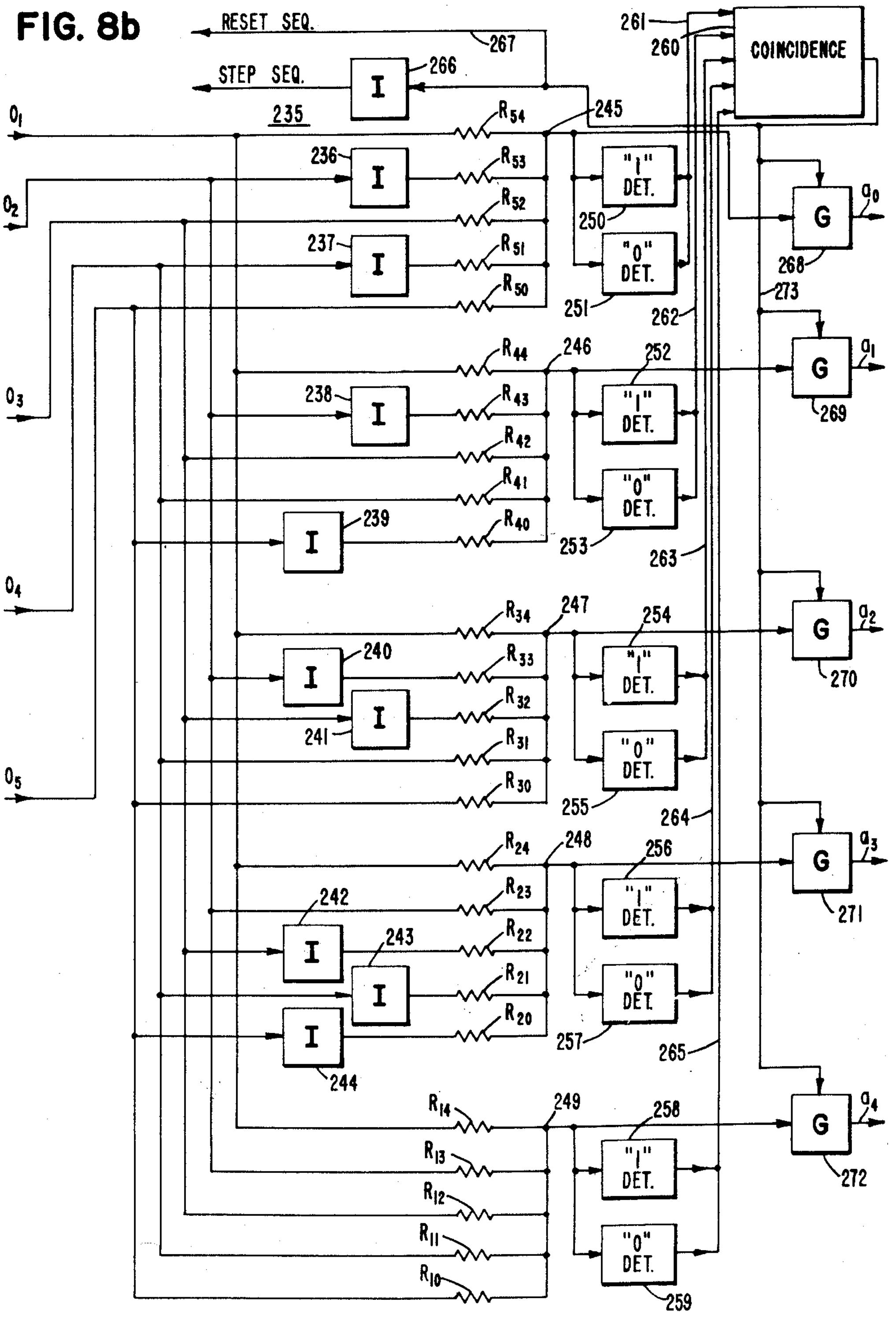

FIGURE 8 discloses means for calculating binary bit values in accordance with Equations 8 and Tables 2, 3, and 7 when self-luminous patterns with equal width concentric rings are to be scanned. The mode of operation in FIGURE 8 is parallel, in that all of the binary bits $a_0$–$a_4$ are generated simultaneously.

The signals $B_2$ through $B_5$ from FIGURE 4 or FIGURE 6 are respectively applied via conductors 200 through 203 to pairs of gates 204—205, 206—207, 208—209, and 210—211. Each gate 204, 206, 208, and 210 has its output respectively connected to conductors 212, 213, 214, and 215 on which appear the signals labeled $O_2$, $O_3$, $O_4$ and $O_5$. These gates permit their input signals to appear on these output conductors without change in magnitude or polarity. Each gate 205, 207, 209, and 211 is respectively connected to inverters 217, 220, 221, and 222 which in turn are respectively connected to conductors 212 through 215. The function of the inverters is to change the polarity, but not the magnitude, of a signal applied to their inputs. Signal $B_1$ is applied directly to the conductor 231 and is consequently labeled $O_1$ so as to correspond in terminology with signals $O_2$ through $O_5$.

Each of the gates 204 through 211 is conditioned to pass their respective input signals $B_2$ through $B_5$ by means of signals appearing on associated conductors 223 through 230. Only one gate of each pair can be conditioned during a calculation cycle in accordance with the sign to be associated with the signals $B_2$ through $B_5$. For example, if $B_2$ requires a minus sign for the step 1 calculation in Table 7, gate 205 is conditioned to pass $+B_2$ via inverter 217, resulting in $-B_2$ on conductor 212. Conversely, gate 204 is conditioned during step 5 of Table 7 to allow the $+B_2$ signal to pass unchanged in polarity to conductor 212. Therefore, signals $O_2$ through $O_5$ are merely the signals $B_2$ through $B_5$ with each having a polarity (+ or —) as determined by the conditioned gate in each of the pairs. Inasmuch as no inverter is provided in conductor 231, signal $O_1$ is always $+B_1$.

The cycling means for changing the signs of the numbers represented by the $B_2$ through $B_5$ signals includes a stepped sequence circuit 232 and a switching matrix generally indicated by 234. For economy of time, the embodiment of FIGURE 8 requires only a maximum of thirteen sign changing steps performed in sequence in accordance with Table 7 for calculating the correct values of the binary bits $a_0$ through $a_4$. Thus, sequence circuit 232 has thirteen output conductors 233 numbered accordingly upon which appear signals in succession, there being only one such line energized at any one time. A terminal R is provided to reset circuit 232 to a condition such that output conductor 1 is energized, while a terminal S is provided to receive signals, each of which steps the circuit and energizes a different one of the output conductors in the sequence indicated by their numbers. Sequence circuit 232 may comprise any one of a number of well-known stepping circuits in the art, such as a rotary switch, a ring counter, a binary counter with binary to decimal translation, or the like.

Each conductor 233 is connected to approximate ones of condition conductors 223 through 230 as is illustrated by a small circle surrounding the junction of a vertical and a horizontal line. Figure 7 shows an enlargement of the details within such a circle, for example, that at the intersection of conductors 228 and $233_8$. A unidirectional conducting device like diode 234 is connected with its anode to conductor $233_8$ and its cathode to conductor 228. If conductor $233_8$ is energized by sequence circuit 232, then diode 234 is forward biased such that the signal on $233_8$ is substantially transferred to 228 and thus conditions gate 209 to pass signal $B_4$. However, any signal appearing on conductor 228 due to energization of $233_8$ cannot be applied to others of the vertical conductors 233 because of the back biasing on the diodes associated with these other conductors 233. For example, a signal on 228 in the above instance cannot be applied to any of the vertical conductors 233, $233_2$, $233_7$, $233_9$, $233_{10}$, or $233_{11}$. Thus, the use of diodes or the like in matrix 234 provides isolation between the vertical conductors 233, and consequently between the horizontal conditioning conductors so that none will be energized that are not connected with a single energized conductor 233.

Output signals $O_1$ through $O_5$ are applied to the matrix of resistors generally indicated by 235. In this matrix, each resistor R has a subscript nk which indicates that its value is determined by the correspondingly desginated $A_{nk}^{-1}$ value in Table 2. Thus, resistor $R_{10}$ has a value corresponding to the value of $A_{10}$–1, and so on. As is well known in the art, the function of each resistor in matrix 235 is to effectively multiply the signal applied thereto. In order to obtain negative values of certain $A_{nk}^{-1}$ elements shown in Table 2, inverters 236 through 244 are inserted in circuit with resistors $R_{53}$, $R_{51}$, etc., which in turn have values determined by the absolute values of matrix elements $A_{53}^{-1}$, $A_{51}^{-1}$, etc. Although in practice only one inverter need be used for each of the signals $O_2$ through $O_5$, a separate inverter is shown for each appropriate resistor in order to emphasize the negative quality of the individual $A_{nk}^{-1}$ matrix elements.

In accordance with the equations of matrix 8, groups of the resistors are tied together at respective terminals 245 through 249 in order to sum together the appropriate $B_n \times A_{nk}^{-1}$ products in order to produce the binary bits $a_0$ through $a_4$. For example, resistors $R_{54}$, $R_{53}$, $R_{52}$, $R_{51}$, $R_{50}$ are connected at terminal 245 such that the products $O_1R_{54}$, $O_2R_{53}$, $O_3R_{62}$, $O_4R_{51}$, and $O_5R_{50}$ are summed together. Since each of the above products yields a signal proportional to the products $$\pm A_{54}^{-1}|\Gamma_{(\rho_1)}|,\ \pm A_{53}^{-1}|\Gamma_{(\rho_2)}|,\ \pm A_{52}^{-1}|\Gamma_{(\rho_3)}|,\ \pm A_{51}^{-1}|\Gamma_{(\rho_4)}|\ \text{and}\ \pm A_{50}^{-1}|\Gamma_{(\rho_5)}|$$

respectively, the resulting signal at junction 245 is indicative of binary bit $a_0$ having a value of 1 or 10 if the signs of the Γ functions (or B values) have been correctly assumed. In like fashion, groups of resistor $R_{44}$—$R^{40}$, $R_{34}$—$R_{30}$, $R_{24}$—$R_{20}$, and $R_{14}$—$R_{10}$ perform similar multiply and add functions on the signals $O_1$ through $O_5$ so as to generate binary bits $a_1$ through $a_4$ at terminals 246 through 249, respectively.

As hereinbefore explained, an incorrect sign for one or more of the Γ functions results in a value other than 1 or 0 for one or more of the bits $a_0$ through $a_4$. Therefore, means are provided to see if each signal generated at terminals 245 through 249 is a valid one, i.e., that it has a binary signifiicance of 1 or 0. In the embodiment of FIGURE 8, these "1" and "0" bit detectors are duplicated for each terminal and are indicated by blocks 250 through 259. Each "1" detector generates an output only if the signal applied thereto represents a binary 1, while each "0" detector regards only to a signal representing binary 0. Detectors for generating an output signal upon the detection of equality between an internal reference signal and an input signal are well-known, and their construction will therefore not be described in detail. As before mentioned, however, it may be necessary to design each detector so that there is a small range of values around either "1" or "0," or both, within which a calculated bit is considered valid. This is to compensate for component tolerances, etc.

If any of the signals appearing at terminals 245 through 249 are invalid, i.e., fail to represent binary 0 or 1, then the combination of signs for $B_1$ through $B_5$ must be changed, and bits $a_0$ through $a_4$ recalculated. This is performed in FIGURE 8 by means of a coincidence circuit 260. The outputs from each pair of 1 and 0 detectors associated with the terminals 245 through 249 are OR'ED together and connected via respective conductors 261 through 265 to respective inputs of circuit 260. A signal is generated from circuit 260 only if signals are simultaneously presented to all of its inputs. Thus, if both detectors of any one of the pairs fails to produce a signal, no output is obtained from circuit 260. For example, assume that neither detector 250 nor detector 251 generates a signal, thereby indicating that the $a_0$ signal from terminal 245 is invalid. The absence of the signal on conductor 261 prevents an output from 260 even through bits $a_1$ through $a_4$ may be valid as indicated by a signal appearing from one of the detectors associated with each of the terminals 246 through 249. In this event, a signal is produced from an inverter 266 which steps sequence circuit 232. Each time that one or more invalid bits are calcultaed in a particular step, the absence of a signal from circuit 260 advances sequence 232, in order to change the combination of the $B_n$ signs.

When the correct combintaion of $B_n$ signs has thus been found, signals are applied to all inputs of coincidence circuit 260, resulting in an output therefrom. No stepping signal can now be generated from inverter 266, but instead, the sequence circuit 232 is reset via conductor 267 to prepare it for the recognition of another pattern. At the same time, gates 268 through 272 are conditioned via conductor 273 in order to pass the valid signals representing bits $a_0$ through $a_4$ to further utilization circuitry not shown.

A brief description of the operation of FIGURE 8 will now be given, with particular reference to Tables 3 and 7. Assume that the pattern to be recognized is comprised of equal width concentric rings with only binary significant rings $a_1$ and $a_4$ being self-luminous. Thus, the binary number representing this pattern is 10010 or decimal 18. As seen from Table 3, the respective signs to be associated with the measured values $B_1$ through $B_5$ must be +, −, +, +, and −, in order to generate valid signals for bits $a_0$ through $a_4$ at junctions 245 through 249, respectively. At the beginning of the recognition operation, sequence circuit 232 is at step 1 of Table 7 so that conductor $233_1$ is energized. This allows only gates 205, 206, 209, and 210 to be conditioned. Therefore, signals $O_1$ through $O_5$, which are applied to the resistor matrix 235, respectively represent $$+0.14409240\ (B_1)$$

−0.07282800 ($B_2$), +0.06915921 ($B_3$), −0.03988535 ($B_4$), and +0.03517216 ($B_5$). In resistor matrix 235, these signals are effectively multiplied by the $A_{nk}^{-1}$ values in Table 2 as represented by resistors $R_{nk}$, after which the appropriate products are summed together such that signals representing the following calculated values of bits $a_0$ through $a_4$ appear at terminals 245 through 249, respectively. For the purpose of conserving space, the figures from Tables 2 and 3 shown below includes only two digits to the right of the decimal point, although all of the digits are used in the actual calculation.

1 $$\overset{[a_0]}{+0.84829161} = \overset{[B_1]}{(+0.14)}\overset{[A_{54}^{-1}]}{(+0.49)} + \overset{[B_2]}{(-0.07)}\overset{[A_{53}^{-1}]}{(-1.72)} + \overset{[B_3]}{(+0.06)}\overset{[A_{52}^{-1}]}{(+3.29)} + \overset{[B_4]}{(-0.03)}\overset{[A_{51}^{-1}]}{(-5.62)} + \overset{[B_5]}{(+0.03)}\overset{[A_{50}^{-1}]}{(+5.68)}$$

2 $$\overset{[a_1]}{+0.37083010} = \overset{[B_1]}{(+0.14)}\overset{[A_{44}^{-1}]}{(+1.55)} + \overset{[B_2]}{(-0.07)}\overset{[A_{43}^{-1}]}{(-3.70)} + \overset{[B_3]}{(+0.06)}\overset{[A_{42}^{-1}]}{(+2.76)} + \overset{[B_4]}{(-0.03)}\overset{[A_{41}^{-1}]}{(+2.64)} + \overset{[B_5]}{(+0.03)}\overset{[A_{40}^{-1}]}{(-5.94)}$$

3 $$\overset{[a_2]}{+0.24281039} = \overset{[B_1]}{(+0.14)}\overset{[A_{34}]}{(2.56)} + \overset{[B_2]}{(-0.07)}\overset{[A_{33}^{-1}]}{(-1.73)} + \overset{[B_3]}{(+0.06)}\overset{[A_{32}^{-1}]}{(-5.40)} + \overset{[B_4]}{(-0.03)}\overset{[A_{31}^{-1}]}{(+2.57)} + \overset{[B_5]}{(+0.03)}\overset{[A_{30}^{-1}]}{(+6.36)}$$

4 $$\overset{[a_3]}{+0.23641826} = \overset{[B_1]}{(+0.14)}\overset{[A_{24}^{-1}]}{(+3.34)} + \overset{[B_2]}{(-0.07)}\overset{[A_{23}^{-1}]}{(+3.58)} + \overset{[B_3]}{(+0.06)}\overset{[A_{22}^{-1}]}{(-1.49)} + \overset{[B_4]}{(-0.03)}\overset{[A_{21}^{-1}]}{(-8.56)} + \overset{[B_5]}{(+0.03)}\overset{[A_{20}^{-1}]}{(-6.35)}$$

5 $$\overset{[a_4]}{+0.51566298} = \overset{[B_1]}{(+0.14)}\overset{[A_{14}^{-1}]}{(+3.76)} + \overset{[B_2]}{(-0.07)}\overset{[A_{13}^{-1}]}{(+7.91)} + \overset{[B_3]}{(+0.06)}\overset{[A_{12}^{-1}]}{(11.44)} + \overset{[B_4]}{(-0.03)}\overset{[A_{11}^{-1}]}{(11.97)} + \overset{[B_5]}{(+0.03)}\overset{[A_{10}^{-1}]}{(+6.69)}$$

From the above, it is seen that for step 1 of sequence circuit 232, none of the calculated values for bits $a_0$ through $a_4$ are valid. Therefore, none of the detectors 250 through 259 are energized so that no output is possible from 260. In this event, a signal may be produced from inverter 266 to advance sequence circuit to Step 2.

In step 2, gates 205, 206, 209, and 211 are conditioned to cause values $B_2$, $B_3$, $B_4$ and $B_5$ to have respective signs −, +, −, and − in accordance with Table 7. The calculated values for $a_0$ through $a_4$ are now +0.44854678, +0.78927338, −0.20516916, +0.68351112, and +0.04443147, respectively. Again, a step signal will be generated because of invalid bit values in order to advance sequence circuit to Step 3.

In Step 3, gates 205, 206, 208, and 211 are conditioned to result in $B_2$ through $B_5$ signs of −, +, +, and −, respectively. Since $B_1$ is always +, it is seen from Table 3 that this combination of signs should give valid calculated values of 10010 for bits $a_4$ through $a_0$, respectively. That this is the case may be shown by multiplying and summing in the manner illustrated in Step 1, with regard being given to the Step 3 signs of the $B_n$ numbers. Therefore, detectors 251, 252, 255, 257, and 258 produce signals whose coincidence is detected by circuit 260. The output therefrom resets the sequence circuit, and gates out the valid bit signals.

Thus, in the example given above, only three steps of the sequence need be performed. With patterns representing different binary numbers, however, a fewer or a greater number of steps may be required. The apparatus of FIGURE 8 may be changed for patterns of any bit size, and the sequence of steps, as well as their number, may be altered. However, as previously pointed out in connection with Table 7, the preferred embodiment for a five bit pattern utilizes 13 steps (the minimum number) arranged generally in the sequence shown.

Figure 9A:
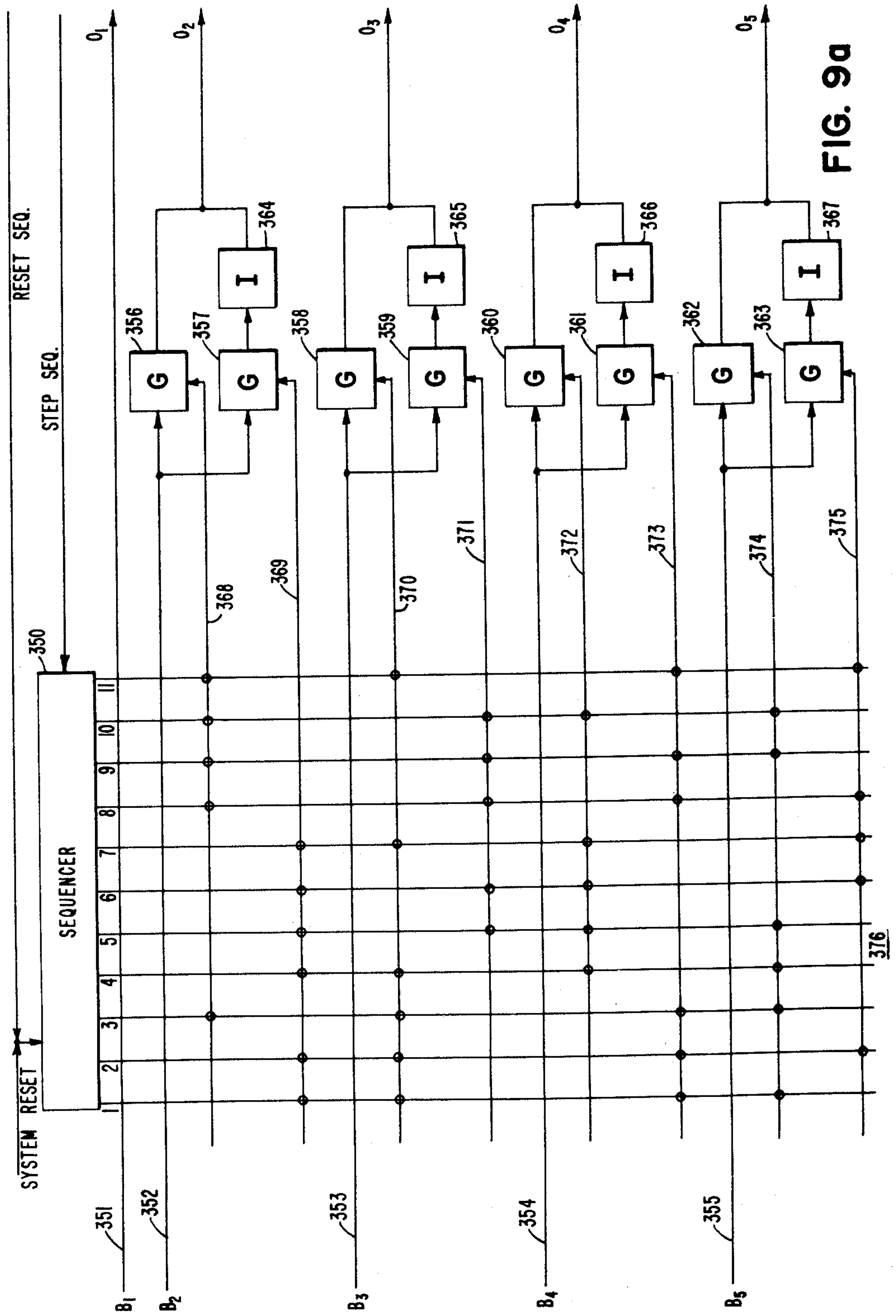
FIGURE 9 shows a second embodiment for calculating binary bits from the measured pattern invariant characteristics.
Figure 9B:
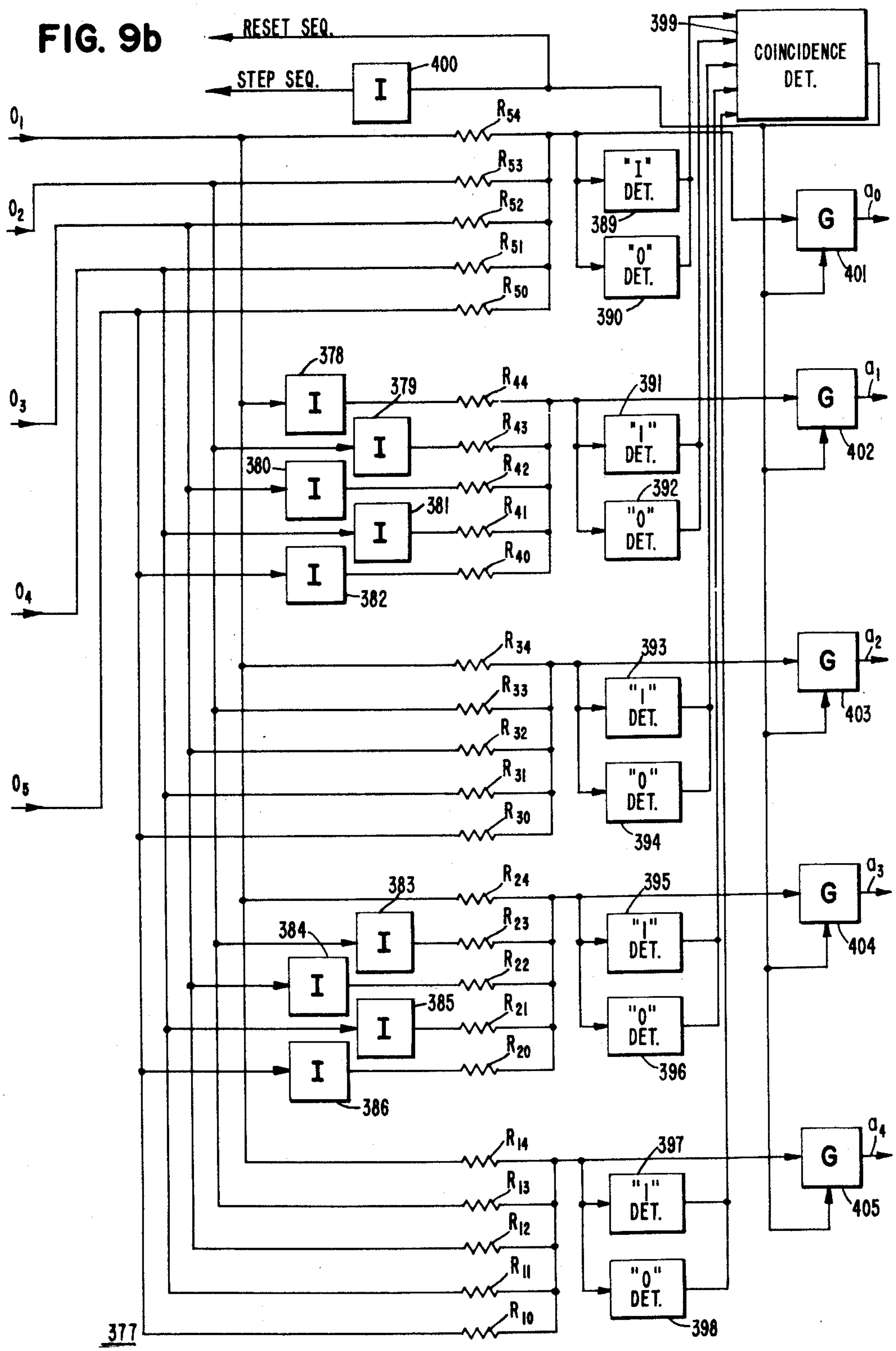

FIGURE 9 shows another embodiment of the calculating unit generally along the lines of FIGURE 8, but particularly adapted for use in the recognition system when patterns of equal area bands are to be sensed. Since specific patterns identified by five bit binary numbers have been given as illustrative examples throughout this discussion, FIGURE 9 also is limited to calculation of a five bit number. However, the principles embodied therein may obviously be employed in devising apparatus for use with patterns having a greater or lesser number of code combinations.

In FIGURE 9, a sequence circuit 350 is provided having eleven outputs to correspond with Table 8 showing the minimum number of steps required to insure that all patterns can be recognized. This can be contrasted with the thirteen step sequence circuit in FIGURE 8. The signals $B_1$ through $B_5$, from circuits such as those in either FIGURE 4 or FIGURE 6, are introduced on conductors 351 through 355, respectively. The sign combination of signals $B_2$ through $B_5$ are changed in each step in accordance with Table 8 by virtue of gates 356 through 363, and inverters 364 through 367, which are selectively conditioned by the energized ones of conductors 368 through 375. This is exactly similar to the operation detailed above in connection with FIGURE 8, except, of course, that the specific connections between the outputs of sequencer 350 and the gate conditioning lines 368 through 375 are different. Each circle around selected intersections of the sign changing matrix 376 represents a connection as shown in FIGURE 7.

The multiplication and summation resistor matrix 377 is similar to that in FIGURE 8, except that the values of all resistors $R_{10}$ through $R_{54}$ therein are determined by the corresponding $A_{10}^{-1}$ through $A_{54}^{-1}$ values in Table 5. However, another change in FIGURE 9 from FIGURE 8 is the location and number of the inverters 378 through 386 which are inserted to effectively make negative those $A_{nk}^{-1}$ values with which they are associated. Pairs of "1" and "0" detectors 389 through 398 are individually associated with the summing terminals at which appear the calculated values of bits $a_0$ through $a_4$. A coincidence detector 399 is likewise provided to ascertain the presence or absence of validity in these calculated bits. Gates 401 through 405 pass only valid codes, while inverter 400 is responsive to the absence of an output from circuit 399 for stepping circuit 350.

The operation of FIGURE 9 is exactly the same as that of FIGURE 8, taking into account the different number and order of the steps as may be ascertained from an examination of Table 8. Therefore, no detailed description is given of the recognition of a specific equal area pattern. It should be emphasized however, that the $B_n$ signals generated for use in FIGURE 9 represent absolute values corresponding to those in Table 6. Although FIGURES 8 and 9 show preferred embodiments of the calculating and sign changing unit of the present invention, it is apparent that apparatus may be devised having different multiplication and/or summing units, or different modes of operation, but performing the same general calculating algorithm as exemplified by matrix Equations 8. For example, the signals $B_1$ through $B_5$ may be translated into digital numbers so that the multiplication and summation is digital in nature rather than analog. Also, the calculation of the bits $a_0$ through $a_4$ may be performed serially at the expense of operating time, but with a saving of equipment.

Figure 10:
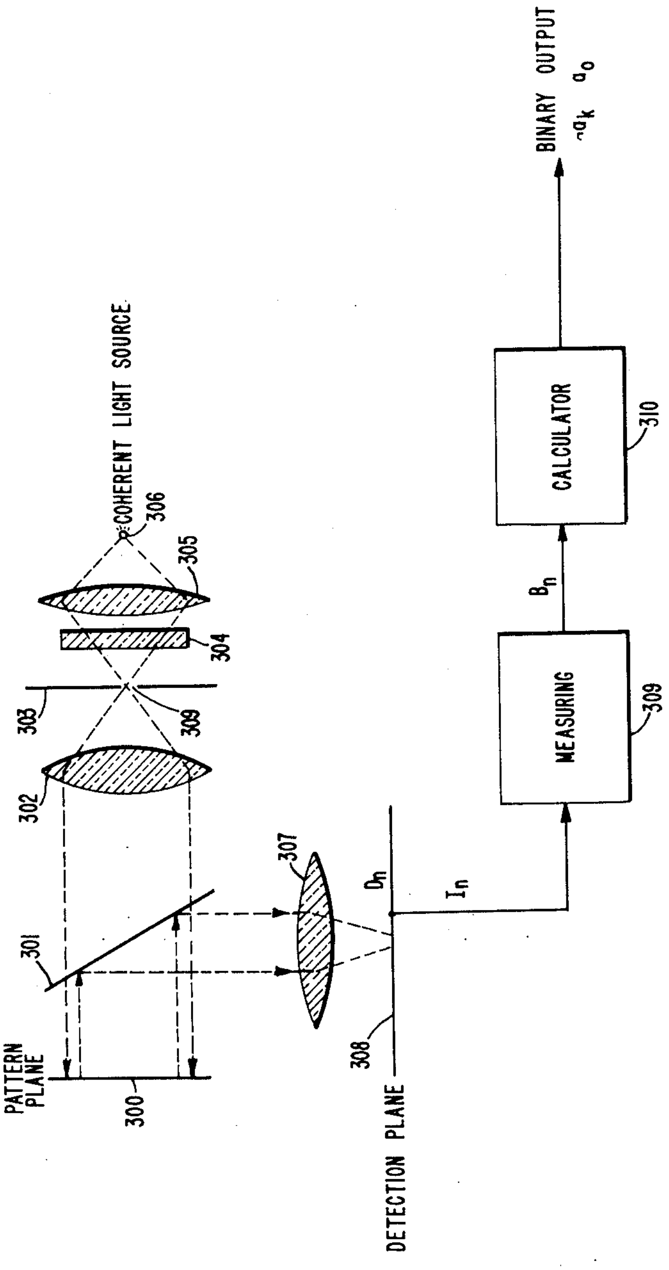
FIGURE 10 shows a block diagram of a second embodiment of the invention for coherently illuminating a reflecting pattern and measuring its invariant characteristics.

The foregoing analysis have been limited to self-luminous circular patterns. However, it is also applicable to circular patterns which are illuminated by coherent light, as is shown in FIGURE 10. In this case, each band that is to have a coefficient $a_k$ equal to 1 is made of some highly reflective material, such as "Scotchlite" brand reflective sheeting made by the Minnesota Mining and Manufacturing Co. A source 306 of high pressure mercury may be employed, together with lens 305, filter 304, and a pinhole 309, to form a quasi-monochromatic point source of light. Light from this source is then collumnated by lens 30 and passed through a half-silvered mirror 301 to strike the pattern at plane 300. The pinhole 309 should be at the backfocal plane of lens 302.

At the pattern plane, light is reflected back only from those bands made of the reflective material. This reflected light strikes the under side of mirror 301 to be reflected down through lens 307 to strike the detectors $D_n$ at back focal plane 308. A Fraunhofer diffraction image of the pattern now appears at detection plane 308. The measuring and calculating circuits 309 and 310 are generally the same as those previously described for recognition of self-luminous patterns, with the assumption that the light intensity at the center detector $D_0$ is equal to unity. Another, and possibly simpler technique for measuring values $B_n$, is to ascertain the light intensity at each of the detector rings $D_1$ through $D_N$, then take the square root of each before applying to the calculating circuit 310. However, a different interpretation must be given 1 when illuminating patterns by coherent light to the output signals $B_n$, although numerically the values derived therefor are the same as shown in Tables 3 and 6. In order to understand this difference, the following brief analysis will be given.

Generally, the absolute value of the Fraunhofer diffraction pattern wave amplitude at each of the detection rings $D_1$ through $D_N$ is invariant for translation of the pattern at plane 300. This quantity may be represented by $$|\Gamma_{(\rho_n)}|$$

and corresponds numerically, although not dimensionally, with the values of $$|\Gamma_{(\rho_n)}|$$

at the corresponding rings. In the case of the self-luminous patterns, the value $$\Gamma_{(\rho_n)}$$

is equal to the Fourier transform of the object intensity, while in the case of a coherently illuminated pattern, the value $$F_{(\rho_n)}$$

is equal to the Fourier transform of the object wave amplitude. The square of the absolute value $$|F_{(\rho_n)}|$$

is equal to the intensity $I_n$ the light at detector $D_n$, such that $$|F_{(\rho_n)}|^2 = I_n$$

Therefore, an analogy may be drawn between the values $I_n$ for a coherently illuminated pattern and the values $$|\Gamma_{(\rho_n)}|^2$$

for a self-luminous pattern. Therefore, the values $B_n$ generated in FIGURE 10 respectively represent the wave amplitudes $$|F_{(\rho_n)}|$$

which may be inserted into the previous equations in place of $$|\Gamma_{(\rho_n)}|$$

Although these two signals may differ dimensionally, they have the same numerical values for purposes of combination with the previously given $A_{nk}^{-1}$ values. The radius $\rho_n$ of the detection rings may be found by the same equations, as well as the values $A_{nk}$. The preceding analysis for circular patterns may also be extended for the base of patterns 8 and 10 in FIGURE 1, both when they are self-luminous or coherently illuminated. However, these square and bar patterns will not be correctly recognized when they are rotated with respect to the optical axis of the detectors but only if they are moved in directions parallel to the X and Y coordinate axes of the detectors. Thus, the values $$|\Gamma| \text{ or } |F|$$

are not invariant for a rotational translation of these patterns. The sampling points for each of the detectors 9 or 11 is given by Equation 14, when using the distance from the center of the pattern to the detector in question. These distances may be represented by $X_1, X_{21} \ldots X_n$, and correspond to radii $\rho_1, \rho_2 \ldots \rho_n$ in the preceding equations.

While representative embodiments of the invention have been shown and described, many modifications and changes may be made thereto without departing from the spirit of the invention as expressed in the appended claims.

What is claimed is:

1. Apparatus for recognizing a pattern composed of information bands each having binary order significance in accordance with the light emanating therefrom, said apparatus comprising in combination: a first sampling position and a plurality of *n* sampling positions spaced apart from each other and from said first position, at which light from said pattern is incident, means responsive to the incident light at said first sampling position together with the incident light at each of said *n* sampling positions for generating *n* signals respectively representing the absolute values of the Fourier transform of the light distribution at said pattern, means for storing calculated values of matrix elements, means for selectively multiplying each of said $n$ signals by different ones of said stored matrix elements, and means to selectively add certain of the products of said multiplication to generate each digit of a binary number representing said pattern.

2. Apparatus according to claim 1 in which said $n$ sampling positions are in the shape of concentric rings enclosing said first sampling position.

3. Apparatus according to claim 1 in which said $n$ sampling positions are in the shape of concentric squares enclosing said first sampling position.

4. Apparatus according to claim 1 in which said $n$ sampling positions are in the shape of parallel lines on each side of said first sampling position.

5. Apparatus according to claim 1 in which said $n$ sampling positions are symmetrical about said first sampling position.

6. Apparatus according to claim 5 in which an $n$th sampling position of said plurality is spaced apart from said first sampling position according to $$\frac{\lambda_{0n}}{K\alpha}$$

where $\lambda_{0n}$ is the $n$th root of the Bessel function $J_0(X)=0$, K is $2\pi$ divided by the wave length of incident light from the pattern, and $\alpha$ is one-half of the maximum width of the pattern.

7. Apparatus according to claim 1 which further includes an objective lens placed between said sampling positions and said pattern so that all of said sampling positions be at the back focal plane of said lens.

8. Apparatus according to claim 7 wherein said $n$ signals generating means comprises photo-detector means at each of said $n$ sampling positions and at said first sampling position, correlator means selectively responsive to currents from both said first photo-detector sampling position and an $n$th photo-detector sampling position for generating an $n$th output signal, and square root means responsive to said $n$th output signal for generating said $n$th signal representing a Fourier transform absolute value.

9. Apparatus according to claim 7 in which said $n$ signals generating means comprises a shutter at each of said $n$ sampling positions and at said first sampling position, a photo-detector situated behind said first sampling position at the image plane, means to open only said first sampling position shutter so that said photo-detector is responsive to light therethrough to generate a current $I_0$, means to open only an $n$th sampling position shutter so that said photo-detector is responsive to light therethrough to generate a current $I_n$, means to open both said first sampling position shutter and said $n$th sampling position shutter so that said photo-detector is responsive to light transmitted therethrough to generate a current $I_{n0}$, means to phase shift said last mentioned transmitted light by one-quarter wave length so that said photo-detector generates a current $I_{n0}'$, means to subtract $I_0$ and $I_n$ from $I_{n0}$ to form a first signal value, means to subtract $I_0$ and $I_n$ from $I_{n0}'$ to form a second signal value, means to square said first and second signal values, means to sum said squared values, and square root means responsive to said sum for generating said $n$th signal representing a Fourier transform absolute value.

10. Apparatus according to claim 1 in which said multiplying means includes means for selectively changing the signs of said $n$ signals, together with means for examining each of said generated binary digits to determine its validity, and means responsive to a determination of invalidity by said examining means to operate said sign changing means.

11. In an apparatus for recognizing a pattern composed of information bands each having binary order significance in accordance with the light emanating therefrom, the combination comprising: a first sampling position and a plurality of $n$ sampling positions spaced apart from each other and from said first position, at which light from said pattern is incident, and means responsive to the incident light at said first sampling position together with the incident light at each of said $n$ sampling positions for generating $n$ signals respectively representing the square of the absolute values of the Fourier transform of the light distribution at said pattern.

12. A combination according to claim 11 in which said $n$ sampling positions are symmetrical about at least one axis of said first sampling position.

13. A combination according to claim 12 in which an $n$th sampling position of said plurality is spaced apart from said first sampling position according to $$\frac{\lambda_{0n}}{K\alpha}$$

where $\lambda_{0n}$ is the $n$th root of the Bessel functions $J_0(x)=0$, K is $2\pi$ divided by the wavelength of incident light from said pattern, and $\alpha$ is one-half of the maximum width of the pattern.

14. Apparatus according to claim 1 which further includes an objective lens placed between said sampling positions and said pattern so that all of said sampling positions lie at the back focal plane of said lens.

15. Apparatus according to claim 14 wherein said $n$ signals generating means comprises photo-detector means at each of said $n$ sampling positions and at said first sampling position, and correlator means selectively responsive to currents from both said first photo-detector sampling position and an $n$th photo-detector sampling position for generating an $n$th signal.

16. Apparatus according to claim 14 in which said $n$ sampling positions are in the shape of circular concentric rings.

17. Apparatus according to claim 14 in which said $n$ sampling positions are in the shape of concentric squares.

References Cited in the file of this patent

UNITED STATES PATENTS

| | | |
|---|---|---|
| 2,434,561 | Hardy et al. | Jan. 13, 1948 |
| 2,793,807 | Yaeger | May 28, 1957 |
| 2,982,853 | Price et al. | May 2, 1961 |

UNITED STATES PATENT OFFICE
CERTIFICATE OF CORRECTION

Patent No. 3,074,634 January 22, 1963

Hideya Gamo

It is hereby certified that error appears in the above numbered patent requiring correction and that the said Letters Patent should read as corrected below.

Column 1, line 22, for "rotation" read -- rotational --; line 67, for "invarient" read -- invariant --; column 2, line 8, for "reffecting" read -- reflecting --; column 3, line 45, for "under" read -- order --; column 4, line 15, for that portion of the equation reading "$\pi_3{}^2$" read -- $\pi r_3{}^2$ --; column 5, line 34, for "u, v" read -- (u, v) --; line 46, for "limits," read -- limits), --; column 6, line 33, before "etc." insert a vertical line; column 7, line 2, for that portion of the equation reading "$+A_{23}a_3$" read -- $\pm A_{23}a_3$ --; line 38, for "$A_{21}{}^{-1}$" read -- $A_{21}{}^{-1}|$ --; column 7, line 47, strike out the dash at the end of the line; line 50, for "$A_{nk}{}^{1}$" read -- $A_{nk}{}^{-1}$ --; column 10, line 14, for "$\pm A_{nk}{}^{1}$" read -- $\pm A_{nk}{}^{-1}$ --; column 11, line 50, for that portion of equation 25 reading "$\Gamma a_9$" read -- $\Gamma a_0$ --; column 13, line 62, for "stirring" read -- striking --; column 15, line 53, for "$1_0$" read -- $I_0$ --; lines 65 and 66, for "Sequence" read -- Sequencer --; column 16, line 41, for "Equations 33 and 34" read -- Equations (33) and (34) --; line 52, for "$I_{(o+1)}$" read -- $I_{(n+1)}$ --; column 18, line 38, the expression "$|\Gamma(\rho 4)|$" read -- $|\Gamma(\rho 4)|^2$ --; column 22, line 2, for "desginated" read -- designated --; line 22, for "$O_3R_{62}$" read -- $O_3R_{52}$ --; column 22, line 29, for "1 or 10" read -- 1 or 0 --; column 23, line 50, the third expression, for $$\underset{(-0.03)}{[B]} \quad \text{read} \quad \underset{(-0.03)}{[B_4]}$$

column 25, line 75, for "$|\Gamma(\rho n)|$" read -- $|F(\rho n)|$ --.

Signed and sealed this 22nd day of October 1963.

(SEAL)
Attest:

ERNEST W. SWIDER
Attesting Officer

EDWIN L. REYNOLDS
Acting Commissioner of Patents